US010009251B1

United States Patent
Koster et al.

(10) Patent No.: US 10,009,251 B1
(45) Date of Patent: Jun. 26, 2018

(54) TUPLE TRAFFIC MANAGEMENT

(71) Applicant: International Business Machines Corporation, Armonk, NY (US)

(72) Inventors: David M. Koster, Rochester, MN (US); Christopher R. Sabotta, Rochester, MN (US); Joseph C. Schmidt, Rochester, MN (US); Manuel Orozco, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/700,348

(22) Filed: Sep. 11, 2017

Related U.S. Application Data

(63) Continuation of application No. 15/479,349, filed on Apr. 5, 2017.

(51) Int. Cl.
*H04L 12/26* (2006.01)
*H04L 12/851* (2013.01)
*H04L 12/801* (2013.01)
*H04L 12/853* (2013.01)
*H04L 29/08* (2006.01)

(52) U.S. Cl.
CPC .......... *H04L 43/0876* (2013.01); *H04L 43/16* (2013.01); *H04L 47/11* (2013.01); *H04L 47/2416* (2013.01); *H04L 47/2483* (2013.01); *H04L 67/141* (2013.01); *H04L 67/10* (2013.01)

(58) Field of Classification Search
CPC ................................................ H04L 43/1097

USPC ......................................................... 709/224
See application file for complete search history.

(56) References Cited

U.S. PATENT DOCUMENTS

| 9,674,249 B1 | 6/2017 | Kekre et al. |
|---|---|---|
| 2007/0255653 A1 | 11/2007 | Tumminaro et al. |
| 2013/0304903 A1 | 11/2013 | Mick et al. |
| 2014/0136176 A1 | 5/2014 | Branson et al. |
| 2017/0063724 A1 | 3/2017 | Cao et al. |

OTHER PUBLICATIONS

Menage, "Adding Generic Process Containers to the Linux Kernel", Proceedings of the Linux Symposium, 2007, vol. 2, pp. 45-58.
Unknown, "Examples of transformations for valid stream graphs", IBM, IBM Knowledge Center, IBM InfoSphere Streams Version 4.1.1, 3 pages, printed Mar. 30, 2017.
Koster et al., "Tipple Traffic Management", U.S. Appl. No. 15/479,349, filed Apr. 5, 2017.
List of IBM Patents or Patent Applications Treated as Related, dated Sep. 8, 2017, pp: 1-2.

*Primary Examiner* — Adnan Mirza
(74) *Attorney, Agent, or Firm* — Scott S. Dobson

(57) ABSTRACT

Disclosed aspects relate to tuple traffic management in a stream computing environment to process a stream of tuples using a set of control group data with respect to a set of operation-system-level virtualization and resource isolation containers. The set of control group data may be collected with respect to a set of containers in the stream computing environment. A tuple flow model may be determined with respect to the set of containers in the stream computing environment based on the set of control group data. The stream of tuples may be processed using the tuple flow model with respect to the set of containers in the stream computing environment.

1 Claim, 15 Drawing Sheets

TUPLE TRAFFIC MANAGEMENT

BACKGROUND

This disclosure relates generally to computer systems and, more particularly, relates to tuple traffic management in a stream computing environment to process a stream of tuples using a set of control group data with respect to a set of operation-system-level virtualization and resource isolation containers. The amount of data that needs to be managed is increasing. As data needing to be managed increases, the need for tuple traffic management in a stream computing environment may also increase.

SUMMARY

Aspects of the disclosure relate to tuple traffic management in a stream computing environment to process a stream of tuples using a set of control group data with respect to a set of operation-system-level virtualization and resource isolation containers. A tuple flow model may be determined to process the stream of tuples based on the set of control group data. The tuple flow model may be determined using soft limits and hard limits for the set of control group data. Resource consumption per tuple may be analyzed to determine the limiting resource affecting stream performance and the tuple load limitation of the system, and this information may be communicated to one or more upstream splitting operators to evenly balance tuple flow, modify the number of parallel channels in an operator graph, rebalance tuple flow based on capacity changes, present future traffic flow allocations, and ascertain when limits or thresholds that may impact shared resource consumption are achieved.

Disclosed aspects relate to tuple traffic management in a stream computing environment to process a stream of tuples using a set of control group data with respect to a set of operation-system-level virtualization and resource isolation containers. The set of control group data may be collected with respect to a set of containers in the stream computing environment. A tuple flow model may be determined with respect to the set of containers in the stream computing environment based on the set of control group data. The stream of tuples may be processed using the tuple flow model with respect to the set of containers in the stream computing environment.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
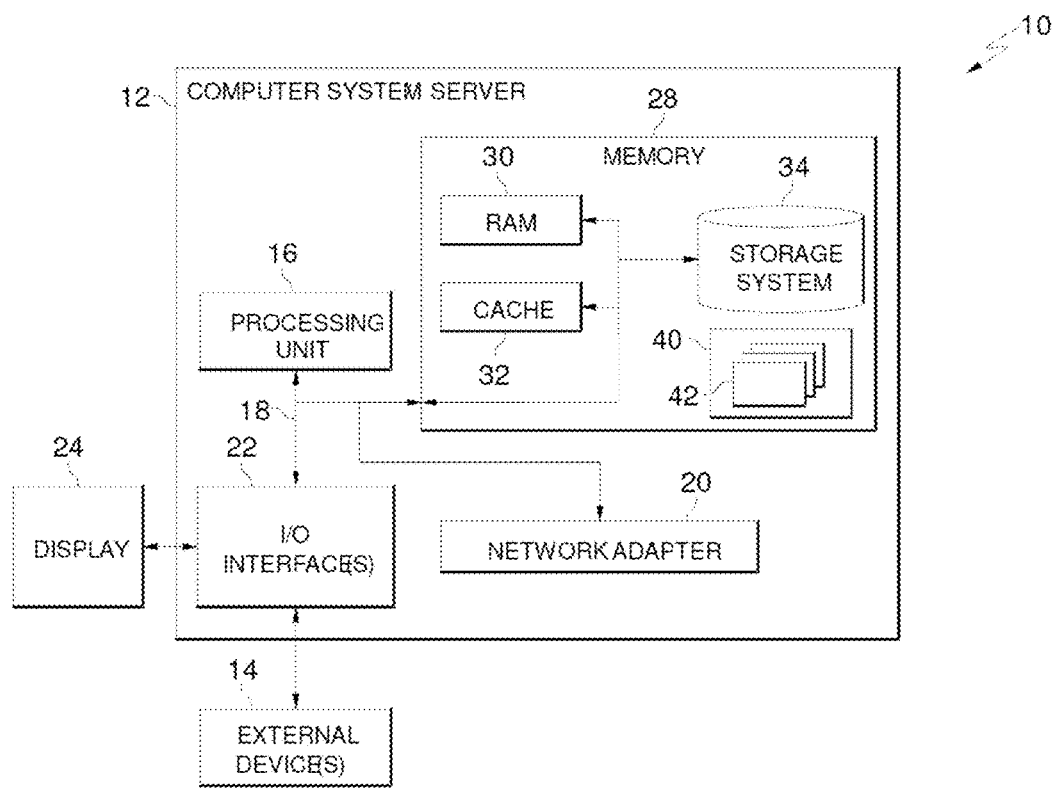
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to tuple traffic management in a stream computing environment to process a stream of tuples using a set of control group data with respect to a set of operation-system-level virtualization and resource isolation containers. A tuple flow model may be determined to process the stream of tuples based on the set of control group data (e.g., block Input/Output, Central Processing Unit, memory, class identifier, network priority). The tuple flow model may be determined using soft limits and hard limits for the set of control group data. Resource consumption per tuple may be analyzed to determine the limiting resource affecting stream performance and the tuple load limitation of the system, and this information may be communicated to one or more upstream splitting operators to evenly balance tuple flow, modify the number of parallel channels in an operator graph, rebalance tuple flow based on capacity changes, present future traffic flow allocations, and ascertain when limits or thresholds that may impact shared resource consumption are achieved. Leveraging control group data management with respect to a set of containers in a stream computing environment may be associated with benefits including load-balancing efficiency, flexibility, and stream computing performance.

Parallel regions are one tool used in stream computing environments to partition tuples for divided processing. Tuples may be split between a number of flow paths spread out over a plurality of virtualized container environments to allow for simultaneous processing and mitigate congestion. In some cases, different flow paths may be associated with different performance characteristics based on the host hardware and container configurations in which operators are placed. Aspects of the disclosure relate to the recognition that, in some situations, tuples may be assigned to particular flow paths without taking into account the performance characteristics of that flow path, resulting in unbalanced resource loads for different containers (e.g., some containers may be idle while others are associated with congestion and slowdown). Accordingly, aspects of the disclosure relate to collecting a set of control group data (e.g., block Input/Output, Central Processing Unit, memory, class identifier, network priority), and using the collected set of control group data to determine a tuple flow model with respect to the set of containers in the stream computing environment. As such, tuples may be assigned to flow paths based on the performance characteristics of that flow path to facilitate load-balancing in the stream computing environment.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure include a method, system, and computer program product for tuple traffic management in a stream computing environment to process a stream of tuples using a set of control group data with respect to a set of operation-system-level virtualization and resource isolation containers. The set of control group data may be collected with respect to a set of containers in the stream computing environment. A tuple flow model may be determined with respect to the set of containers in the stream computing environment based on the set of control group data. The stream of tuples may be processed using the tuple flow model with respect to the set of containers in the stream computing environment.

In embodiments, determining the tuple flow model based on the set of control group data may include using both a set of soft limits for a set of utilization parameters associated with the set of control group data and a set of hard limits for the set of utilization parameters associated with the set of control group data. In embodiments, the tuple flow model may be resolved with respect to the set of containers in the stream computing environment based on a set of parameter values for a set of utilization parameters in the stream computing environment. In embodiments, a set of stream channels which use the set of containers in the stream computing environment may be established based on the tuple flow model, and the stream of tuples may be processed in the stream computing environment using the tuple flow model with respect to the set of stream channels which use the set of containers. Altogether, performance or efficiency benefits with respect to tuple traffic management may occur. Aspects may save resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
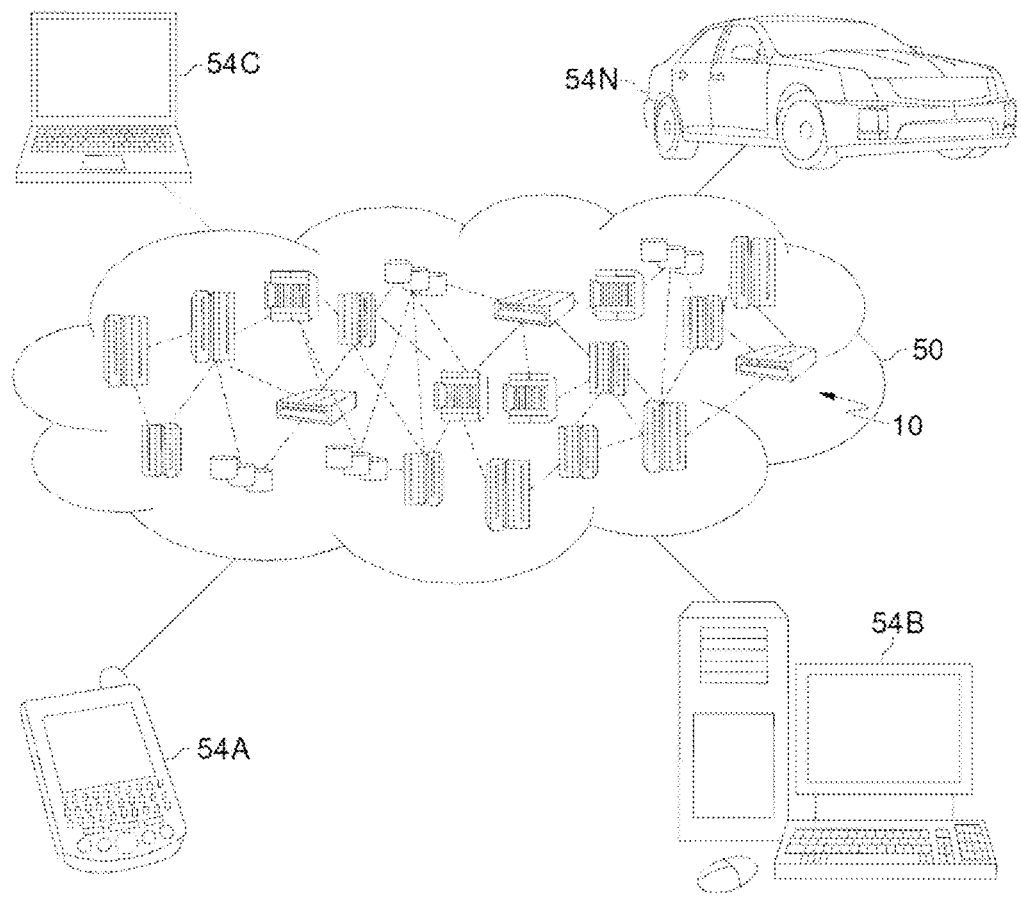
FIG. 2 depicts a cloud computing environment according to embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
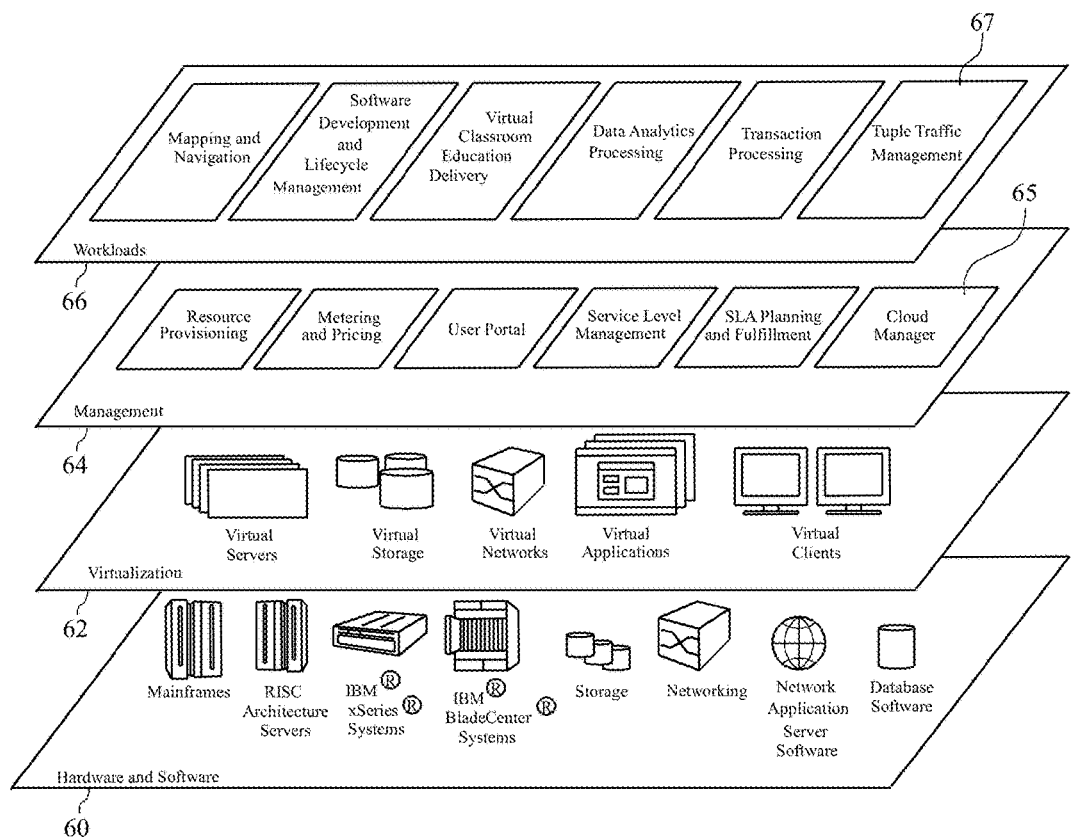
FIG. 3 depicts abstraction model layers according to embodiments.

Referring now to FIG. 3, a set of functional abstraction layers provided by cloud computing environment 50 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 60 includes hardware and software components. Examples of hardware components include mainframes, in one example IBM System z systems; RISC (Reduced Instruction Set Computer) architecture based servers, in one example IBM Power Systems; IBM System x systems; IBM BladeCenter systems; storage devices; networks and networking components. Examples of software components include network application server software, in one example IBM WebSphere® application server software; database software, in one example IBM DB2® database software; and streaming software, in one example IBM InfoSphere® Streams stream computing software. IBM, System z, Power Systems, System x, BladeCenter, InfoSphere, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 65 is representative of a cloud manager (or shared pool manager) as described in more detail below. While the cloud manager 65 is shown in FIG. 3 to reside in the management layer 64, cloud manager 65 can span all of the levels shown in FIG. 3, as discussed below.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and tuple traffic management 67, which may be utilized as discussed in more detail below.

Figure 4:
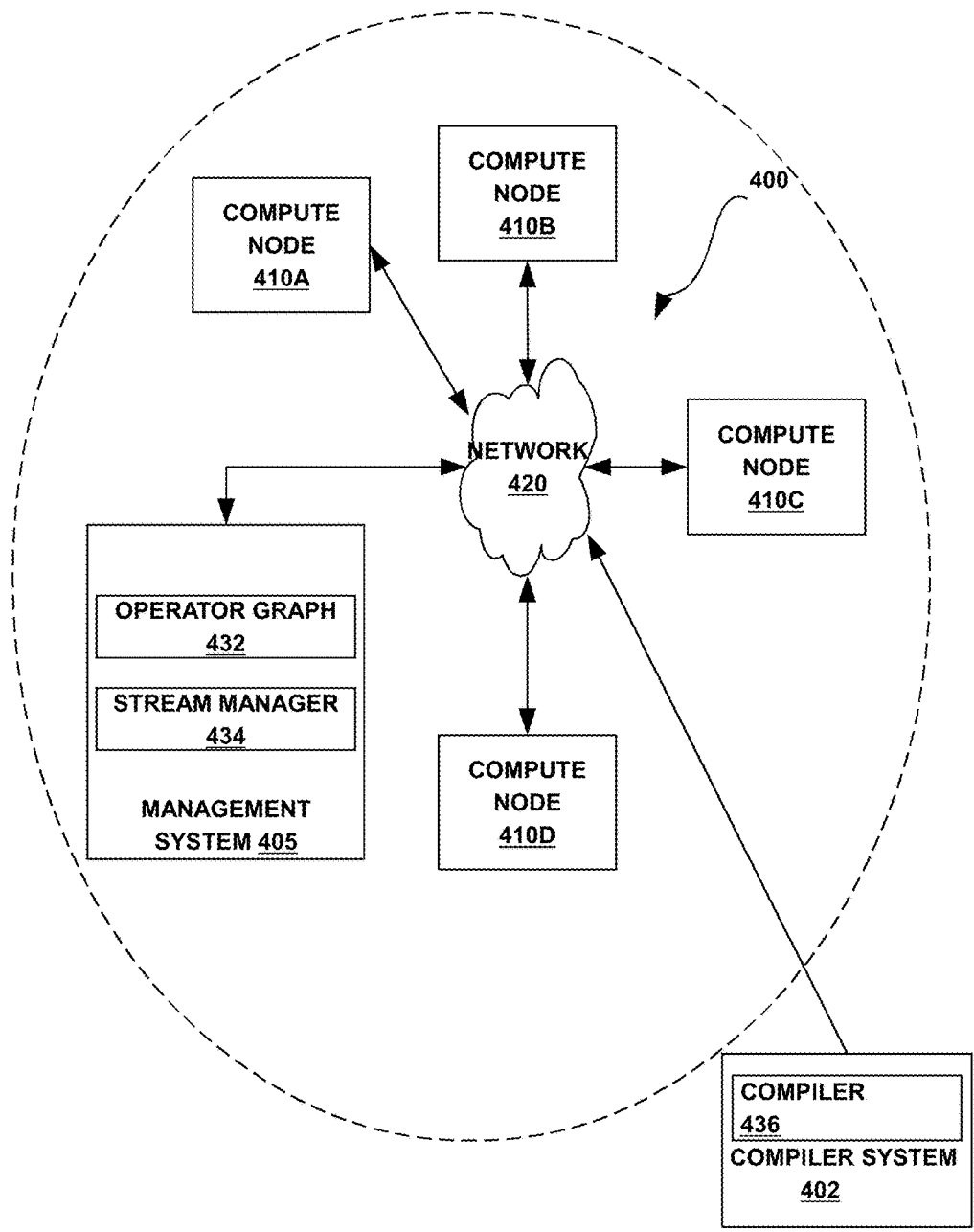
FIG. 4 illustrates an exemplary computing infrastructure to execute a stream computing application according to embodiments.

FIG. 4 illustrates one exemplary computing infrastructure 400 that may be configured to execute a stream computing application, according to some embodiments. The computing infrastructure 400 includes a management system 405 and two or more compute nodes 410A-410D—i.e., hosts—which are communicatively coupled to each other using one or more communications networks 420. The communications network 420 may include one or more servers, networks, or databases, and may use a particular communication protocol to transfer data between the compute nodes 410A-410D. A compiler system 402 may be communicatively coupled with the management system 405 and the compute nodes 410 either directly or via the communications network 420.

The communications network 420 may include a variety of types of physical communication channels or "links." The links may be wired, wireless, optical, or any other suitable media. In addition, the communications network 420 may include a variety of network hardware and software for performing routing, switching, and other functions, such as routers, switches, or bridges. The communications network 420 may be dedicated for use by a stream computing application or shared with other applications and users. The communications network 420 may be any size. For example, the communications network 420 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 5:
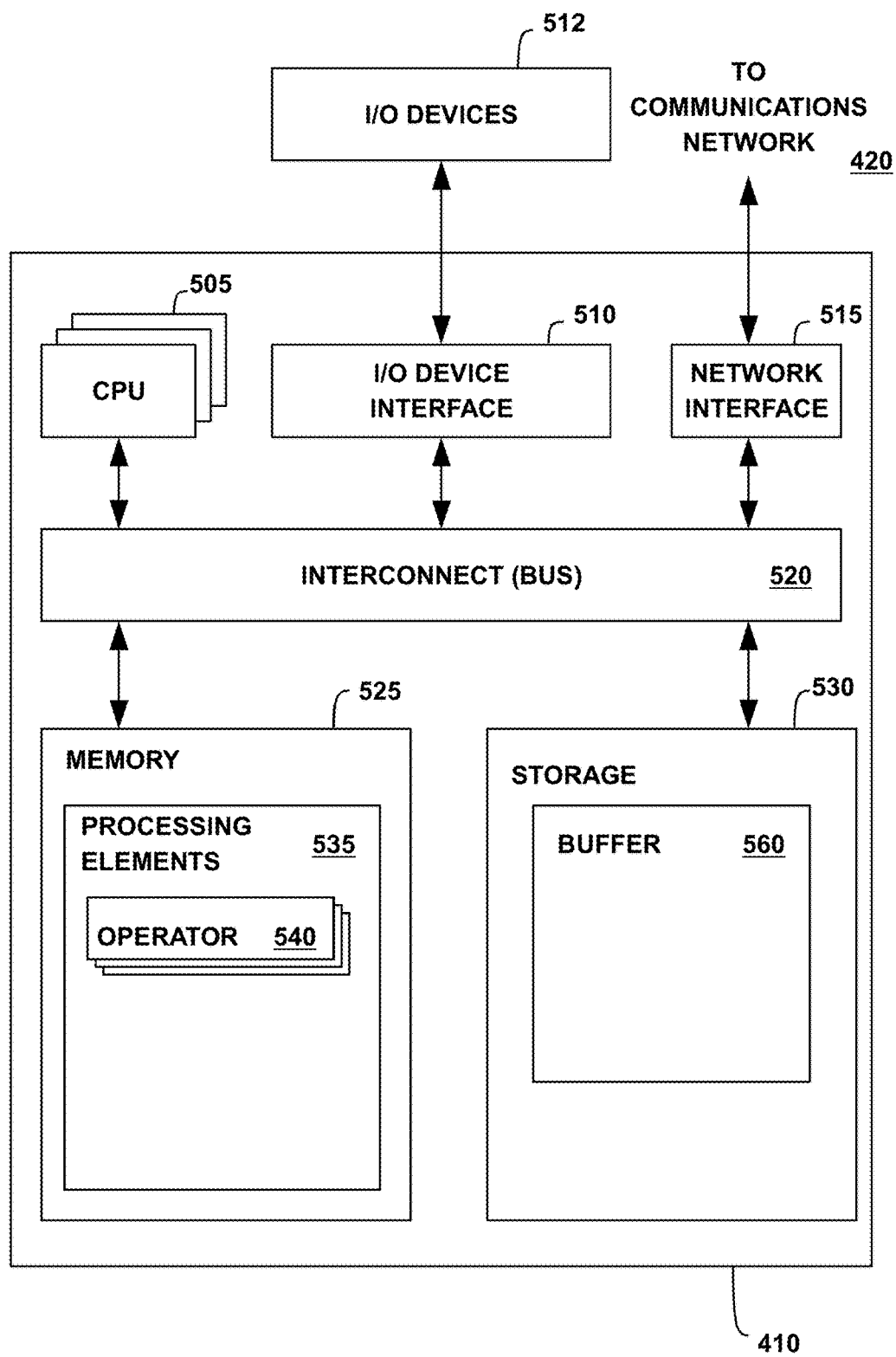
FIG. 5 illustrates a view of a compute node according to embodiments.

FIG. 5 is a more detailed view of a compute node 410, which may be the same as one of the compute nodes 410A-410D of FIG. 4, according to various embodiments. The compute node 410 may include, without limitation, one or more processors (CPUs) 505, a network interface 515, an interconnect 520, a memory 525, and a storage 530. The compute node 410 may also include an I/O device interface 510 used to connect I/O devices 512, e.g., keyboard, display, and mouse devices, to the compute node 410.

Each CPU 505 retrieves and executes programming instructions stored in the memory 525 or storage 530. Similarly, the CPU 505 stores and retrieves application data residing in the memory 525. The interconnect 520 is used to transmit programming instructions and application data between each CPU 505, I/O device interface 510, storage 530, network interface 515, and memory 525. The interconnect 520 may be one or more busses. The CPUs 505 may be a single CPU, multiple CPUs, or a single CPU having multiple processing cores in various embodiments. In one embodiment, a processor 505 may be a digital signal processor (DSP). One or more processing elements 535 (described below) may be stored in the memory 525. A processing element 535 may include one or more stream operators 540 (described below). In one embodiment, a processing element 535 is assigned to be executed by only one CPU 505, although in other embodiments the stream operators 540 of a processing element 535 may include one or more threads that are executed on two or more CPUs 505. The memory 525 is generally included to be representative of a random access memory, e.g., Static Random Access Memory (SRAM), Dynamic Random Access Memory (DRAM), or Flash. The storage 530 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 515 is configured to transmit data via the communications network 420.

A stream computing application may include one or more stream operators 540 that may be compiled into a "processing element" container 535. The memory 525 may include two or more processing elements 535, each processing element having one or more stream operators 540. Each stream operator 540 may include a portion of code that processes tuples flowing into a processing element and outputs tuples to other stream operators 540 in the same processing element, in other processing elements, or in both the same and other processing elements in a stream computing application. Processing elements 535 may pass tuples to other processing elements that are on the same compute node 410 or on other compute nodes that are accessible via communications network 420. For example, a processing element 535 on compute node 410A may output tuples to a processing element 535 on compute node 410B.

The storage 530 may include a buffer 560. Although shown as being in storage, the buffer 560 may be located in the memory 525 of the compute node 410 or in a combination of both memories. Moreover, storage 530 may include storage space that is external to the compute node 410, such as in a cloud.

The compute node 410 may include one or more operating systems. An operating system may be stored partially in memory 525 and partially in storage 530. Alternatively, an operating system may be stored entirely in memory 525 or entirely in storage 530. The operating system provides an interface between various hardware resources, including the CPU 505, and processing elements and other components of the stream computing application. In addition, an operating system provides common services for application programs, such as providing a time function.

Figure 6:
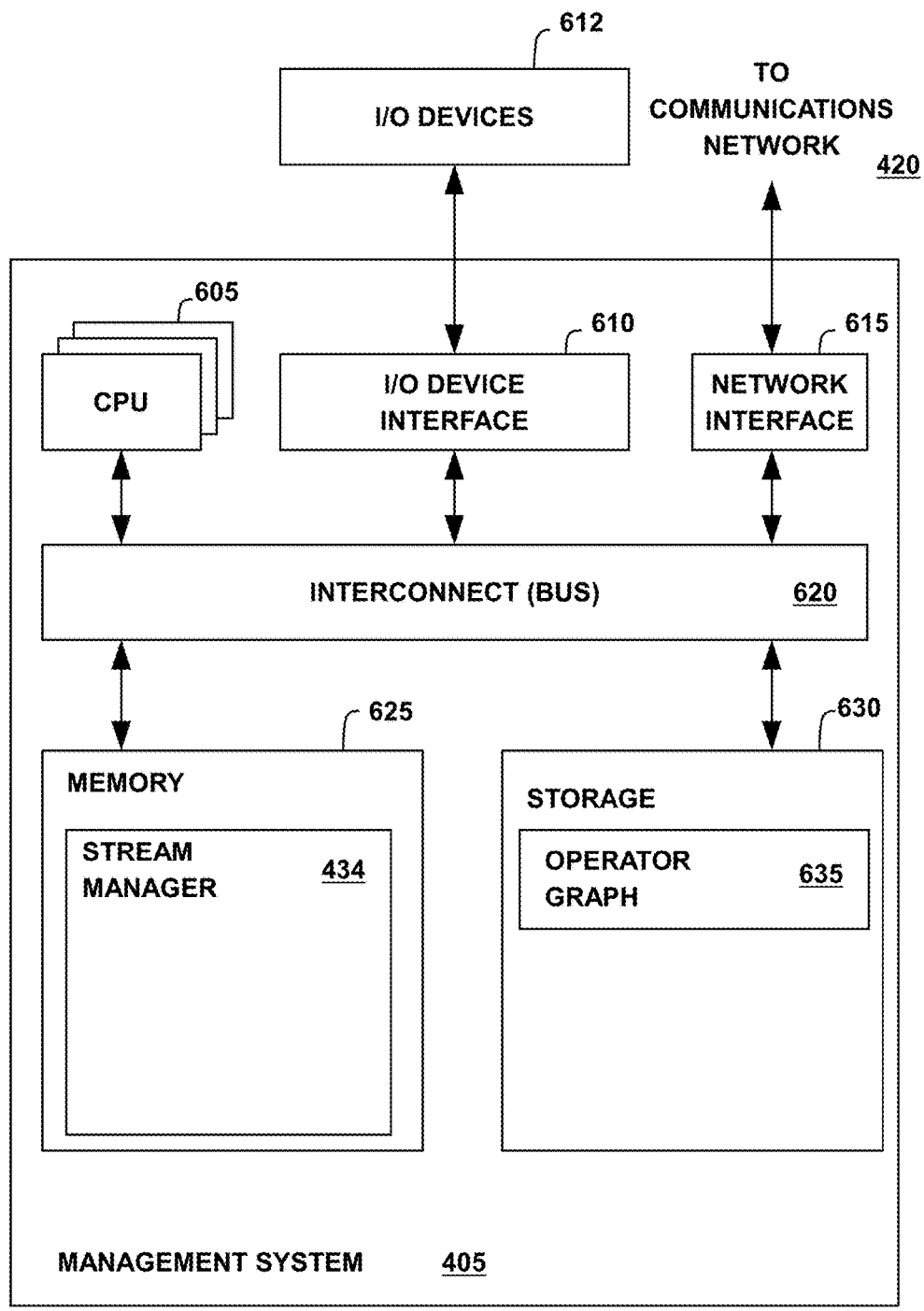
FIG. 6 illustrates a view of a management system according to embodiments.

FIG. 6 is a more detailed view of the management system 405 of FIG. 4 according to some embodiments. The management system 405 may include, without limitation, one or more processors (CPUs) 605, a network interface 615, an interconnect 620, a memory 625, and a storage 630. The management system 405 may also include an I/O device interface 610 connecting I/O devices 612, e.g., keyboard, display, and mouse devices, to the management system 405.

Each CPU 605 retrieves and executes programming instructions stored in the memory 625 or storage 630. Similarly, each CPU 605 stores and retrieves application data residing in the memory 625 or storage 630. The interconnect 620 is used to move data, such as programming instructions and application data, between the CPU 605, I/O device interface 610, storage unit 630, network interface 615, and memory 625. The interconnect 620 may be one or more busses. The CPUs 605 may be a single CPU, multiple CPUs, or a single CPU having multiple processing cores in various embodiments. In one embodiment, a processor 605 may be a DSP. Memory 625 is generally included to be representative of a random access memory, e.g., SRAM, DRAM, or Flash. The storage 630 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 615 is configured to transmit data via the communications network 420.

The memory 625 may store a stream manager 434. Additionally, the storage 630 may store an operator graph 635. The operator graph 635 may define how tuples are routed to processing elements 535 (FIG. 5) for processing or stored in memory 625 (e.g., completely in embodiments, partially in embodiments).

The management system 405 may include one or more operating systems. An operating system may be stored partially in memory 625 and partially in storage 630. Alternatively, an operating system may be stored entirely in memory 625 or entirely in storage 630. The operating system provides an interface between various hardware resources, including the CPU 605, and processing elements and other components of the stream computing application. In addition, an operating system provides common services for application programs, such as providing a time function.

Figure 7:
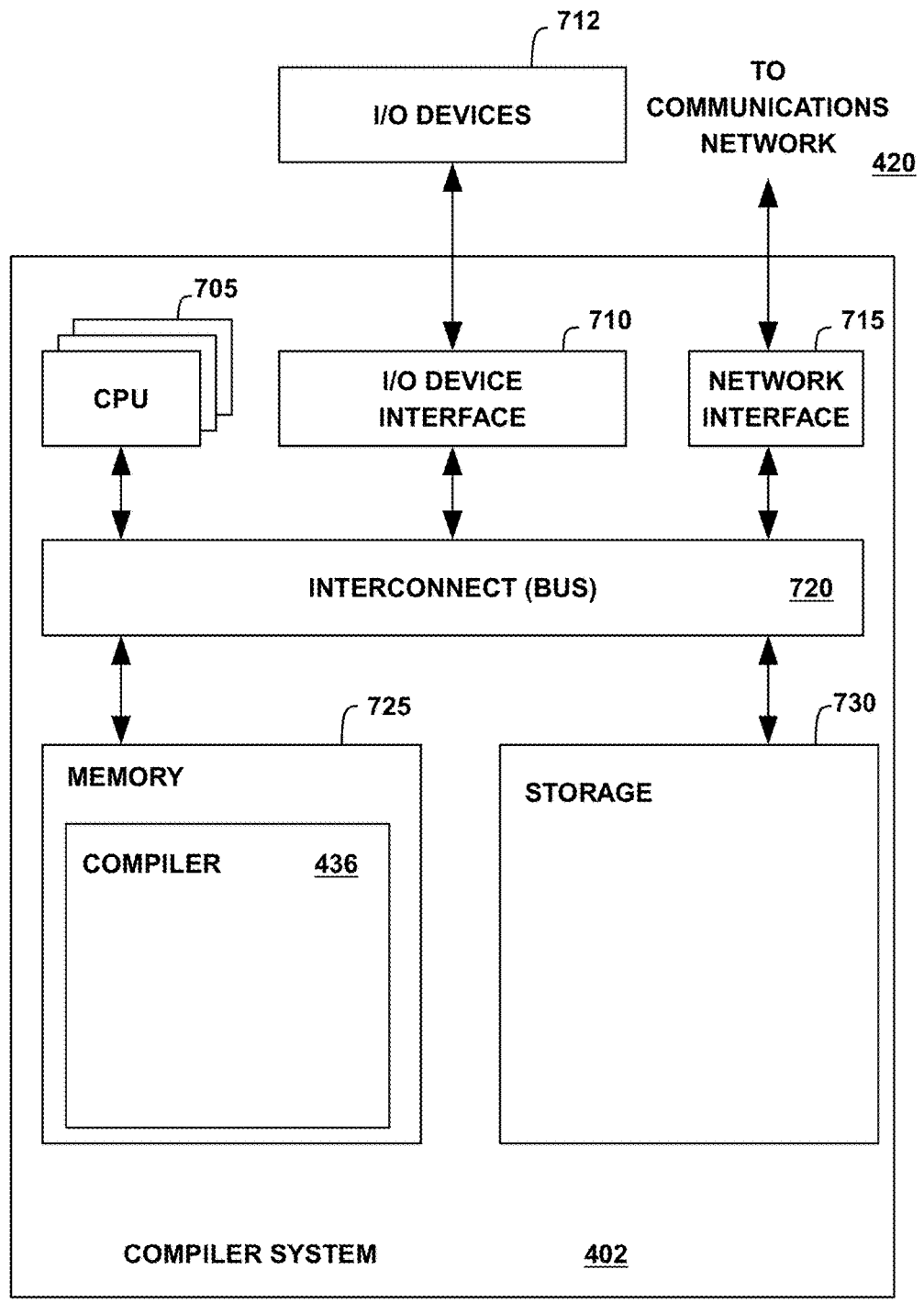
FIG. 7 illustrates a view of a compiler system according to embodiments.

FIG. 7 is a more detailed view of the compiler system 402 of FIG. 4 according to some embodiments. The compiler system 402 may include, without limitation, one or more processors (CPUs) 705, a network interface 715, an interconnect 720, a memory 725, and storage 730. The compiler system 402 may also include an I/O device interface 710 connecting I/O devices 712, e.g., keyboard, display, and mouse devices, to the compiler system 402.

Each CPU 705 retrieves and executes programming instructions stored in the memory 725 or storage 730. Similarly, each CPU 705 stores and retrieves application data residing in the memory 725 or storage 730. The interconnect 720 is used to move data, such as programming instructions and application data, between the CPU 705, I/O device interface 710, storage unit 730, network interface 715, and memory 725. The interconnect 720 may be one or more busses. The CPUs 705 may be a single CPU, multiple CPUs, or a single CPU having multiple processing cores in various embodiments. In one embodiment, a processor 705 may be a DSP. Memory 725 is generally included to be representative of a random access memory, e.g., SRAM, DRAM, or Flash. The storage 730 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 715 is configured to transmit data via the communications network 420.

The compiler system 402 may include one or more operating systems. An operating system may be stored partially in memory 725 and partially in storage 730. Alternatively, an operating system may be stored entirely in memory 725 or entirely in storage 730. The operating system provides an interface between various hardware resources, including the CPU 705, and processing elements and other components of the stream computing application. In addition, an operating system provides common services for application programs, such as providing a time function.

The memory 725 may store a compiler 436. The compiler 436 compiles modules, which include source code or statements, into the object code, which includes machine instructions that execute on a processor. In one embodiment, the compiler 436 may translate the modules into an intermediate form before translating the intermediate form into object code. The compiler 436 may output a set of deployable artifacts that may include a set of processing elements and an application description language file (ADL file), which is a configuration file that describes the stream computing application. In some embodiments, the compiler 436 may be a just-in-time compiler that executes as part of an interpreter. In other embodiments, the compiler 436 may be an optimizing compiler. In various embodiments, the compiler 436 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 436 may be represented by an operator graph (e.g., the operator graph 635 of FIG. 6).

The compiler 436 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 436 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 8:
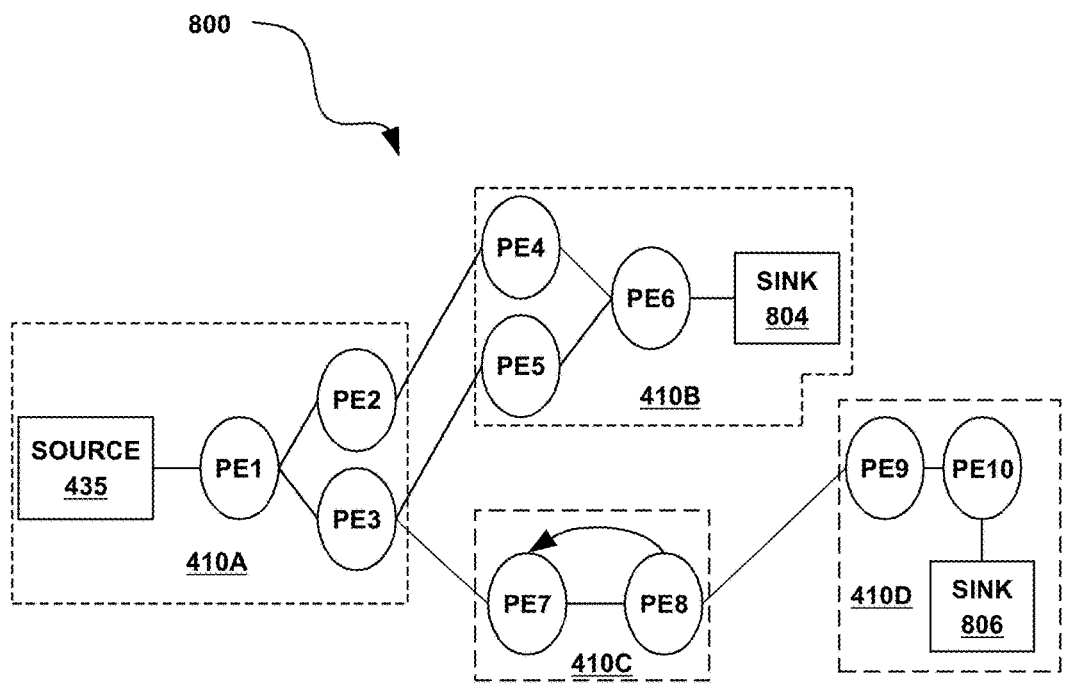
FIG. 8 illustrates an exemplary operator graph for a stream computing application according to embodiments.

FIG. 8 illustrates an exemplary operator graph 800 for a stream computing application beginning from one or more sources 435 through to one or more sinks 804, 806, according to some embodiments. This flow from source to sink may also be generally referred to herein as an execution path. In addition, a flow from one processing element to another may be referred to as an execution path in various contexts. Although FIG. 8 is abstracted to show connected processing elements PE1-PE10, the operator graph 800 may include data flows between stream operators 540 (FIG. 5) within the same or different processing elements. Typically, processing elements, such as processing element 535 (FIG. 5), receive tuples from the stream as well as output tuples into the stream (except for a sink—where the stream terminates, or a source—where the stream begins). While the operator graph 800 includes a relatively small number of components, an operator graph may be much more complex and may include many individual operator graphs that may be statically or dynamically linked together.

The example operator graph shown in FIG. 8 includes ten processing elements (labeled as PE1-PE10) running on the compute nodes 410A-410D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 800 begins at a source 435 and ends at a sink 804, 806. Compute node 410A includes the processing elements PE1, PE2, and PE3. Source 435 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 410B Likewise, the tuples output by PE4 flow to operator sink PE6 804. Similarly, tuples flowing from PE3 to PE5 also reach the operators in sink PE6 804. Thus, in addition to being a sink for this example operator graph, PE6 could be configured to perform a join operation, combining tuples received from PE4 and PE5. This example operator graph also shows tuples flowing from PE3 to PE7 on compute node 410C, which itself shows tuples flowing to PE8 and looping back to PE7. Tuples output from PE8 flow to PE9 on compute node 410D, which in turn outputs tuples to be processed by operators in a sink processing element, for example PE10 806.

Processing elements 535 (FIG. 5) may be configured to receive or output tuples in various formats, e.g., the processing elements or stream operators could exchange data marked up as XML documents. Furthermore, each stream operator 540 within a processing element 535 may be configured to carry out any form of data processing functions on received tuples, including, for example, writing to database tables or performing other database operations such as data joins, splits, reads, etc., as well as performing other data analytic functions or operations.

The stream manager 434 of FIG. 4 may be configured to monitor a stream computing application running on compute nodes, e.g., compute nodes 410A-410D, as well as to change the deployment of an operator graph, e.g., operator graph 432. The stream manager 434 may move processing elements from one compute node 410 to another, for example, to manage the processing loads of the compute nodes 410A-410D in the computing infrastructure 400. Further, stream manager 434 may control the stream computing application by inserting, removing, fusing, un-fusing, or otherwise modifying the processing elements and stream operators (or what tuples flow to the processing elements) running on the compute nodes 410A-410D.

Because a processing element may be a collection of fused stream operators, it is equally correct to describe the operator graph as one or more execution paths between specific stream operators, which may include execution paths to different stream operators within the same processing element. FIG. 8 illustrates execution paths between processing elements for the sake of clarity.

Figure 9:
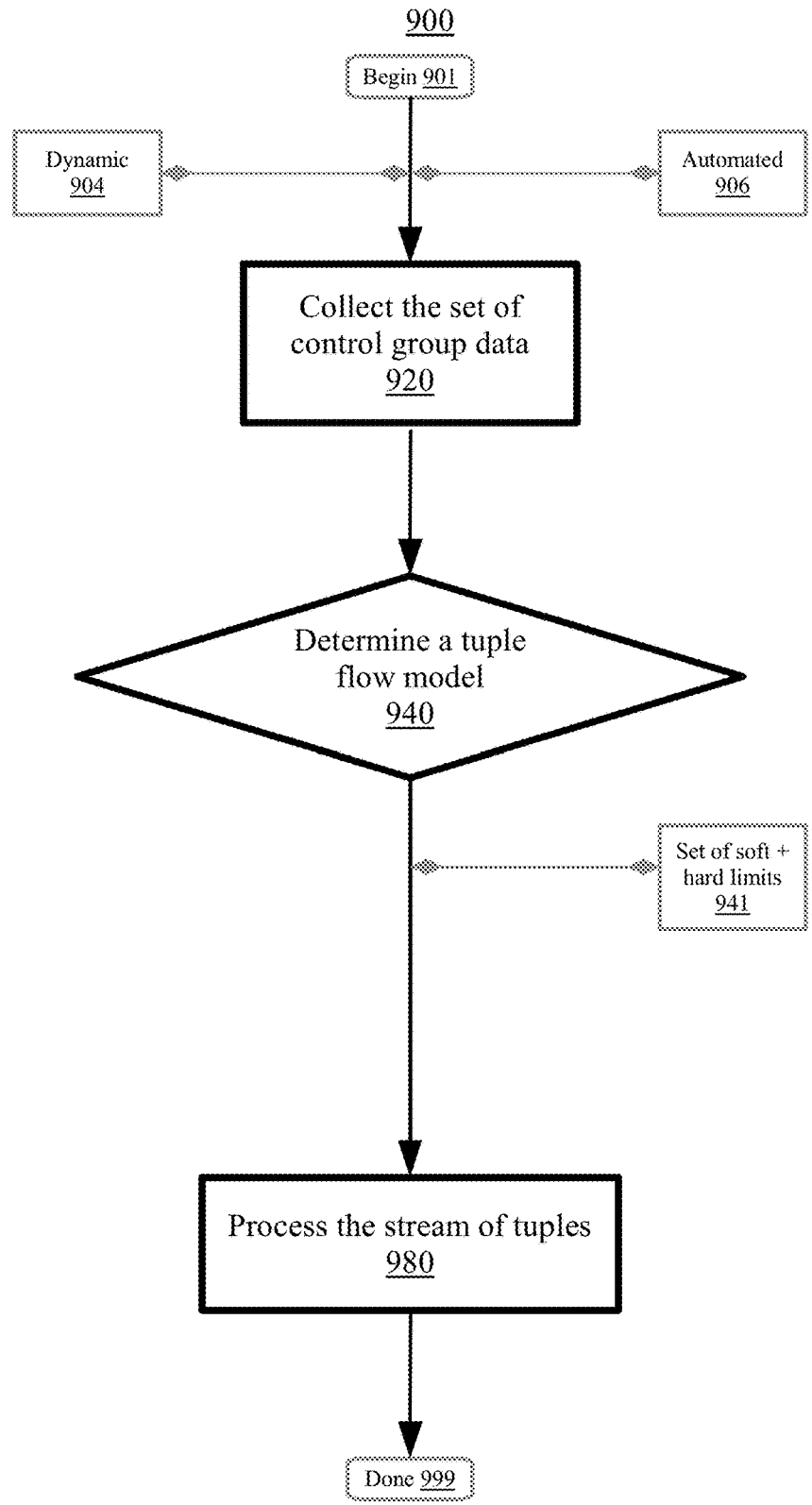
FIG. 9 is a flowchart illustrating a method for tuple traffic management in a stream computing environment, according to embodiments.

FIG. 9 is a flowchart illustrating a method 900 for tuple traffic management in a stream computing environment to process a stream of tuples using a set of control group data with respect to a set of operation-system-level virtualization and resource isolation containers, according to embodiments. Aspects of the method 900 relate to determining a tuple flow model with respect to a set of containers in a stream computing environment to facilitate processing of a stream of tuples. The stream computing environment may include a platform for dynamically delivering and analyzing data in real-time. The stream computing environment may include an operator graph having a plurality of stream operators (e.g., filter operations, sort operators, join operators) and processing elements (e.g., collections of fused stream operators) configured to perform processing operations on tuples flowing through the operator graph. The stream computing environment may facilitate execution and maintenance of one or more stream computing applications that run on one or more hosts (e.g., physical hardware or virtualized environments). In embodiments, the stream computing environment may include a set of containers configured to host the stream computing applications. The set of containers may include an operating-system level virtualization method for deploying and running distributed applications in an isolated environment (e.g., without launching a virtual machine for each application). For instance, the set of containers may be used to isolate a stream computing application and associated processes from other stream computing applications running on the same host. In embodiments, the set of containers may be associated with a set of control group data defining performance characteristics for individual containers of the set of containers. Leveraging control group data management with respect to a set of containers in a stream computing environment may be associated with benefits including load-balancing efficiency, flexibility, and stream computing performance. The method 900 may begin at block 901.

In embodiments, the collecting, the determining, the processing, and the other steps described herein may each be executed in a dynamic fashion at block 904. The executing may be performed in a dynamic fashion to streamline tuple traffic management in the stream computing environment. For instance, the collecting, the determining, the processing, and the other steps described herein may occur in real-time, ongoing, or on-the-fly. As an example, one or more steps described herein may be performed on-the-fly (e.g., tuple flow models may be dynamically determined and modified for a set of containers in the stream computing environment based on the set of control group data for one or more containers at a given time) in order to streamline (e.g., facilitate, promote, enhance) tuple traffic management in the stream computing environment to process the stream of tuples. Other methods of performing the steps described herein are also possible.

In embodiments, the collecting, the determining, the processing, and the other steps described herein may each be executed in an automated fashion at block 906. The executing may be performed in an automated fashion without user intervention. In embodiments, the collecting, the determining, the processing, and the other steps described herein may be carried-out by an internal tuple traffic management module maintained in a persistent storage device of a local computing device (e.g., network node). In embodiments, the collecting, the determining, the processing, and the other steps described herein may be carried-out by an external tuple traffic management module hosted by a remote computing device or server (e.g., server accessible via a subscription, usage-based, or other service model). In this way, aspects of tuple traffic management in a stream computing environment to process a stream of tuples may be performed using automated computing machinery without manual action. Other methods of performing the steps described herein are also possible.

At block 920, the set of control group data may be collected. The collecting may be performed with respect to a set of containers in the stream computing environment. Generally, collecting can include gathering, acquiring, compiling, assembling, obtaining, accumulating, aggregating, or otherwise capturing the set of control group data. As described herein, the set of containers may include one or more isolated process instances running on a shared operating system kernel. For instance, the set of containers may include a first container configured to host a financial transaction management application, a second container configured to host a vehicle fuel economy measurement application, and a third container configured to host an atmospheric pressure monitoring application, where all three containers share the same operating system kernel. The set of control group data may include a collection of information that characterizes the resource utilization of one or more processes of the set of containers. As examples, the set of control group data may characterize the central processing unit (CPU) usage, memory usage, disk input/output (I/O) usage, network usage, and the like for processes executing with respect to a container of the set of containers. In embodiments, collecting the set of control group data may include utilizing a control group utilization diagnostic to monitor the CPU usage, memory usage, disk I/O usage, network usage, and other parameters for processes operating on the set of containers. In certain embodiments, collecting may include configuring a control group resource monitor of a Linux (registered trademark of Linus Torvalds) kernel to audit the resources used by the containers that share that kernel. As an example, a particular Linux kernel may support operation of a set of two containers. The Linux kernel control group resource monitor may perform a series of performance diagnostics on the set of containers, and ascertain that the first container utilizes 18% of the CPU, 4 gigabytes of memory, performs 140 input/output operations per second (IOPS), and uses 800 megabits per second of network bandwidth, and that the second container utilizes 61% of the CPU, 8 gigabytes of memory, performs 4800 TOPS, and uses 1200 megabits per second of network bandwidth. Accordingly, the set of control group data may be recorded in a control group database (e.g., maintained locally by the host or in a central database for the stream computing environment). Other methods of collecting the set of control group data with respect to the set of containers in the stream computing environment are also possible.

At block 940, a tuple flow model may be determined. The determining may be performed with respect to the set of containers in the stream computing environment. The determining may be performed based on the set of control group data. Generally, determining can include computing, formulating, generating, resolving, calculating, selecting, identifying, or otherwise ascertaining the tuple flow model based on the set of control group data. The tuple flow model may include a recommended configuration of the physical and logical topology of the stream computing environment to facilitate processing of the stream of tuples by the set of containers. The tuple flow model may indicate which stream operators/processing elements should be placed on which containers, how parallel regions should be structured within the stream computing environment, recommended physical host hardware specifications and asset placements, resource allocations for particular jobs on particular containers, which operators/processing elements/containers particular sets of tuples should be routed to, and other elements to facilitate efficient processing of the set of tuples by the set of containers. For instance, the tuple flow model may include a stream channel arrangement that designates how a series of stream channels (e.g., execution paths, operational branches) should be distributed throughout the operator graph of a stream computing environment to promote tuple throughput and mitigate congestion. In embodiments, determining the tuple flow model may include using the set of control group data to formulate an arrangement of network assets (e.g., stream operators, processing elements, containers, physical hardware, resources) that achieves a performance threshold with respect to one or more processes operating on containers of the stream computing environment (e.g., tuple throughput above a particular level, resource usage below a certain amount). In embodiments, the tuple flow model may make use of existing network assets that are currently part of the stream computing environment as well as a set of candidate network assets that are part of a shared pool of configurable computing resources (e.g., that may be requested for use in the tuple flow model). As an example, consider that a set of control group data indicates that a first container having 6 gigabytes of memory has a current tuple throughput rate of 500 tuples per second. The stream computing environment may be associated with a target tuple throughput rate of 1000 tuples per second. Accordingly, the set of control group data may be analyzed, and a tuple flow model may be determined in which a second container having 6 gigabytes of memory is requested from a shared pool of configurable computing resources, and a parallel stream channel is established on the second container (e.g., such that tuple traffic may be divided between the first and second containers, and current tuple throughput may be doubled to achieve the target throughput rate of 1000 tuples per second). Other methods of determining the tuple flow model with respect to the set of containers in the stream computing environment based on the set of control group data are also possible.

In embodiments, the tuple flow model may be determined based on the set of control group data at block 941. The set of control group data may use both a set of soft limits for a set of utilization parameters associated with the set of control group data and a set of hard limits for the set of utilization parameters associated with the set of control group data. Generally, determining can include computing, formulating, generating, calculating, selecting, identifying, or otherwise ascertaining the tuple flow model based on both the set of soft limits for the set of utilization parameters and the set of hard limits for the set of utilization parameters associated with the set of control group data. The set of utilization parameters may include one or more assets, properties, resources, or other elements of the set of containers that may be used to facilitate processing of the stream of tuples. As examples, the set of utilization parameters may include CPU utilization, memory utilization, disk I/O utilization, security protocols, network bandwidth, and the like. In embodiments, the set of utilization parameters may be associated with both a set of soft limits and a set of hard limits. The set of soft limits may include a collection of requirements, benchmarks, or guidelines that define a minimum amount (e.g., floor, lowest amount) of the set of utilization parameters (e.g., to maintain stream application performance). The set of hard limits may include a collection of objectives, goals, or aims that define a target amount of the set of utilization parameters (e.g., to allow for smoother/better performance of the stream computing application with respect to the set of soft limits). As an example, a stream computing application may be associated with a set of soft limits that define a minimum amount of required utilization parameters including 1 CPU and 4 gigabytes of memory, and a set of hard limits that define a target amount of utilization parameters including 4 CPUs and 16 gigabytes of memory. In certain embodiments, the set of soft limits may represent a desired amount of the set of utilization parameters, and the set of hard limits may represent threshold utilization parameter ceilings (e.g., maximum amount of resources that may be used). As described herein, the tuple flow model may be determined based on the set of control group data using both the set of soft limits and the set of hard limits. For instance, determining may include comparing the set of soft limits and the set of hard limits with respect to the current topology of the stream computing environment as well as a pool of available computing resources to ascertain a tuple flow model that achieves at least the set of soft limits and does not exceed the set of hard limits. With reference to the previous example, a tuple flow model may be determined in which the stream computing application is allocated 2 CPUs and 12 gigabytes of memory (e.g., achieving the set of soft limits of 1 CPU and 4 gigabytes without exceeding the set of hard limits of 4 CPUs and 16 gigabytes of memory). Other methods of determining the tuple flow model based on the set of control group data using both the set of soft limits and the set of hard limits for the set of utilization parameters associated with the set of control group data are also possible.

At block 980, the stream of tuples may be processed. The processing may be performed using the tuple flow model with respect to the set of containers in the stream computing environment. Generally, processing can include analyzing, evaluating, altering, investigating, examining, modifying, or otherwise managing the stream of tuples using the tuple flow model with respect to the set of containers in the stream computing environment. Processing the stream of tuples may include routing the stream of tuples through the stream computing environment in accordance with the configuration defined by the tuple flow model. In embodiments, processing the stream of tuples may include carrying-out one or more stream computing processing operations on the stream of tuples using the stream operators and processing elements hosted by the set of containers. For instance, processing may include filtering the stream of tuples based on a filter parameter (e.g., date), sorting the stream of tuples based on a sorting parameter (e.g., attribute), joining multiple streams of tuples into an aggregate stream, delaying the stream of tuples (e.g., by a time period), or the like. As an example, consider a stream computing environment that has 4 containers. A tuple flow model for the stream computing environment may define a tuple flow model that designates 2 parallel regions across the 4 containers, where each parallel region includes a filter operator, a sort operator, a delay operator, and a functor operator. A set of control group data may indicate that 60% of the available system resources of the 4 containers are allocated to the first parallel region, and that 40% of the available system resources of the 4 containers are allocated to the second parallel region. Accordingly, processing may include routing the stream of tuples such that 60% of the tuple traffic is assigned to the first parallel region and 40% of the tuple traffic is assigned to the second region. As such, the stream of tuples may undergo processing operations by the filter operator, sort operator, delay operator, and functor operator in accordance with the tuple flow model. Other methods of processing the stream of tuples using the tuple flow model with respect to the set of containers in the stream computing environment are also possible.

Consider the following example. A stream computing environment may include a first physical host node having three containers A, B, and C, and a second physical host node having three containers D, E, and F. A first parallel region may be established such that a first batch of tuples flow through container A, container C, and container E, and a second parallel region may be established such that a second batch of tuples flow through container D, F, and B. A set of control group data may be collected with respect to the set of containers in the stream computing environment, and it may be ascertained that the first parallel region (e.g., containers A, C, and E) is associated with a total of 14 gigabytes of memory, 1.5 CPUs, and a tuple throughput rate of 1300 tuples per second, and that the second parallel region (e.g., containers D, F, and B) are associated with a total of 16 gigabytes of memory, 4 CPUs, and a tuple throughput rate of 1900 tuples per second. In embodiments, the set of control group data may include a set of historical utilization data that indicates that, in the event of a data traffic spike, the first parallel region experiences congestion associated with container C (e.g., memory and processing resources limit the number of tuples that may be processed), while the second parallel region remains idle (e.g., due to a surplus of processing resources). As described herein, a tuple flow model may be determined with respect to the set of containers in the stream computing environment based on the set of control group data. For instance, in embodiments, a tuple flow model may be ascertained to reconfigure the first and second parallel regions to exchange containers C and F to leverage the surplus processing resources of the second physical host node with respect to the first batch of tuples. Additionally, a requisition for additional memory resources that indicates a soft limit of 2 gigabytes and a hard limit of 6 gigabytes may be submitted to a shared pool of configurable computing resources. Accordingly, a tuple flow model may be established such that the first batch of tuples flow through a revised first parallel region of containers A, F, and E, and the second batch of tuples flow through a revised second parallel region of containers D, C, and B. In addition, 4 gigabytes of memory may be received from the shared pool of configurable computing resources with respect to the revised first parallel region. As such, both the revised first parallel region and the revised second parallel region may be associated with a new tuple throughput rate of 1800 tuples per second (e.g., facilitating load balancing in the stream computing environment). Other methods of tuple traffic management in the stream computing environment are also possible.

Method 900 concludes at block 999. Aspects of method 900 may provide performance or efficiency benefits related to tuple traffic management in a stream computing environment to process a stream of tuples. As an example, the control group data may be utilized to facilitate dynamic reconfiguration of the parallel regions and resource distribution of containers in the stream computing environment to promote tuple throughput, load balancing, and stream computing application scalability. Altogether, leveraging control group data management with respect to a set of containers in a stream computing environment may be associated with benefits including load-balancing efficiency, flexibility, and stream computing performance. Aspects may save resources such as bandwidth, processing, or memory.

Figure 10:
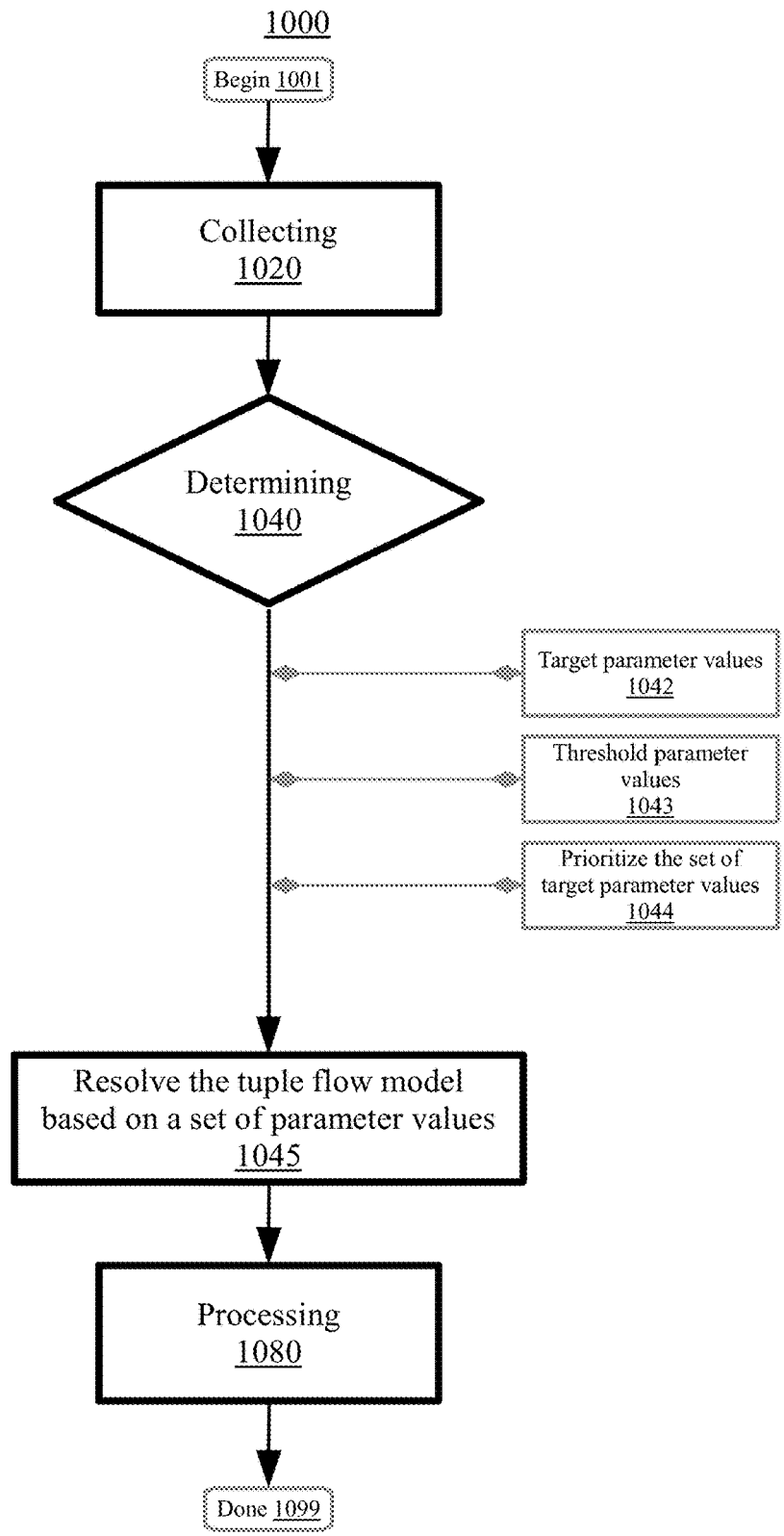
FIG. 10 is a flowchart illustrating a method for tuple traffic management in a stream computing environment, according to embodiments.

FIG. 10 is a flowchart illustrating a method 1000 for tuple traffic management in a stream computing environment to process a stream of tuples using a set of control group data with respect to a set of operation-system-level virtualization and resource isolation containers, according to embodiments. Aspects of FIG. 10 relate to resolving a tuple flow model based on a set of parameter values for a set of utilization parameters in the stream computing environment. Aspects of 1000 may be similar or the same as aspects of method 900, and aspects may be utilized interchangeably. The method 1000 may begin at block 1001. At block 1020, the set of control group data may be collected. The collecting may be performed with respect to a set of containers in the stream computing environment. At block 1040, a tuple flow model may be determined. The determining may be performed with respect to the set of containers in the stream computing environment. The determining may be performed based on the set of control group data.

In embodiments, a set of target parameter values may be ascertained for the set of utilization parameters at block 1042. Generally, ascertaining can include computing, formulating, generating, calculating, selecting, identifying, or otherwise determining the set of target parameter values for the set of utilization parameters. The set of target parameter values may include a collection of values that indicate a desired amount of the set of utilization parameters for use by the set of containers. The set of target parameter values may represent a preferred, favored, or ideal resource allocation for the set of containers. As an example, the set of target parameter values may indicate 12 gigabytes of memory, 6 CPUs, and 3 terabytes of storage space for use with respect to the set of containers (e.g., a hard limit). As another example, the set of target parameter values may be expressed as a target value range (e.g., between 10-14 gigabytes of memory, 4-8 CPUs, and 1.5-4.5 terabytes of storage space). In certain embodiments, the set of target parameter values may represent a lower threshold (e.g., soft limit, floor) regarding the amount of resources to be allocated to the set of containers. In embodiments, ascertaining the set of target parameter values may include using a streams management engine to evaluate a set of historical performance data for one or more stream computing applications running on the set of containers, and computing an amount of utilization parameters that may be used to facilitate performance of the one or more stream computing applications above a desired performance benchmark. As an example, consider a stream computing application running on the set of containers that is currently using 0.5 CPUs and 2 gigabytes of memory, and is achieving a tuple throughput rate of 300 tuples per second. The stream computing application may be associated with a desired performance benchmark of 600 tuples. Accordingly, a set of target parameter values may be ascertained that indicate a desired amount of utilization parameters of 1.5 CPUs and 6 gigabytes of memory. In certain embodiments, ascertaining the set of target parameter values may include receiving a user input that specifies the set of target parameter values for the set of containers. Other usages of the set of threshold parameter values (e.g., as a lower threshold, floor, minimum) are also possible. Other methods of ascertaining the set of target parameter values for the set of utilization parameters are also possible.

In embodiments, a set of threshold parameter values may be ascertained for the set of utilization parameters at block 1043. Generally, ascertaining can include computing, formulating, generating, calculating, selecting, identifying, or otherwise determining the set of threshold parameter values for the set of utilization parameters. The set of threshold parameter values may include a collection of values that indicate a required amount of the set of utilization parameters for use by the set of containers. The set of threshold parameter values may represent a suitable, necessary, or minimum resource allocation (e.g., soft limit) for the set of containers (e.g., to enable operation of a stream computing application). As an example, the set of threshold parameter values may indicate 2 gigabytes of memory, 0.5 CPUs, and 500 gigabytes of storage space for use with respect to the set of containers. In certain embodiments, the set of threshold parameter values may represent an upper threshold (e.g., hard limit) on the amount of utilization parameters that may be used by the set of containers. In embodiments, ascertaining the set of threshold parameter values may include using the streams management engine to evaluate a set of historical performance data for one or more stream computing applications running on the set of containers, and computing an amount of utilization parameters that may be used to facilitate performance of the one or more stream computing applications above a minimum performance benchmark. As an example, consider a stream computing application running on the set of containers that is associated with a minimum performance benchmark of 200 tuples per second. Accordingly, the streams management engine may analyze the nature of the stream computing application with respect to the minimum performance benchmark, and calculate a set of threshold parameter values of 3 gigabytes of memory, 0.25 CPUs, and 250 gigabytes of storage space in order to achieve the minimum performance benchmark of 200 tuples per second. Other usages of the set of threshold parameter values (e.g., as an upper threshold, ceiling, maximum) are also possible. Other methods of ascertaining the set of threshold parameter values for the set of utilization parameters are also possible.

In embodiments, the set of threshold parameter values for the set of utilization parameters may be prioritized relative to the set of target parameter values for the set of utilization parameters at block 1044. The prioritizing may be performed when resolving the tuple flow model with respect to the set of containers in the stream computing environment. Generally, prioritizing can include arranging, weighting, organizing, promoting, ranking, or otherwise favoring the set of threshold parameter values relative to the set of target parameter values. In embodiments, prioritizing may include balancing system resources of the stream computing environment with respect to the set of containers to facilitate achieving the set of threshold parameter values (e.g., soft limits, lower thresholds) for one or more containers before achieving the set of target parameter values (e.g., hard limits, upper thresholds) for a container of the set of containers (e.g., to prioritize basic functionality/operation of each container before fulfilling extra performance requirements). For instance, prioritizing may include allocating system resources from the shared pool of configurable resources to the set of containers such that the set of threshold parameter values for each container are fulfilled, and subsequently re-evaluating the set of containers with respect to the remaining available system resources to ascertain how they may be distributed to achieve the set of target parameter values for one or more containers of the set of containers. Consider the following example. A stream computing environment may include a set of three containers A, B, and C. A set of threshold parameter values may indicate memory requirements of 2 gigabytes, 4 gigabytes, and 6 gigabytes for containers A, B, and C, respectively. A set of target parameter values may indicate memory requirements of 5, 6, and 10 gigabytes for containers A, B, and C, respectively. A shared pool of configurable computing resources may have a total of 16 gigabytes of memory available for use by the set of containers. Accordingly, the set of threshold parameter values may be prioritized such that 2 gigabytes are allocated to container A, 4 gigabytes are allocated to container B, and 6 gigabytes are allocated to container C. Subsequent to achievement of the threshold parameter values for the set of containers, remaining resources may be distributed among the set of containers to promote positive performance of stream computing applications (e.g., an additional 4 gigabytes may be allocated to container C; an additional gigabyte may be distributed to each of containers A, B, and C). Other example usage cases (e.g., in which the set of target parameter values are prioritizes with respect to the set of threshold parameter values) are also possible. Other methods of prioritizing the set of threshold parameter values relative to the set of target parameter values are also possible.

At block 1045, the tuple flow model may be resolved. The resolving may be performed with respect to the set of containers in the stream computing environment. The resolving may be performed based on a set of parameter values for a set of utilization parameters in the stream computing environment. Generally, resolving can include computing, formulating, generating, calculating, selecting, identifying, or otherwise ascertaining the tuple flow model based on the set of parameter values for the set of utilization parameters in the stream computing environment. The set of parameter values may include quantitative indications of an amount of utilization parameters associated with the set of containers. In embodiments, the set of parameter values may include target (e.g., desired, maximum, ceiling, upper thresholds, soft limits, hard limits) or required (e.g., minimum, floor, lower thresholds, soft limits, hard limits) amounts of utilization parameters (e.g., CPU utilization, memory utilization, disk I/O utilization, security protocols, network bandwidth) requested for use by one or more containers of the set of containers. As described herein, the tuple flow model may be resolved based on the set of parameter values for the set of utilization parameters in the stream computing environment. In embodiments, resolving the tuple flow model may include generating a network topology arrangement for the stream computing environment that facilitates achievement of the set of parameter values for the set of containers. For instance, resolving may include distributing existing resources, requisitioning additional resources from a shared pool of configurable computing resources, establishing one or more stream channels (e.g., parallel regions), routing tuples, or performing one or more configuration operations in the stream computing environment in accordance with the set of parameter values. As an example, based on a set of parameter values that indicate that tuple throughput increases by 100% at peak traffic times, resolving the tuple flow model may include instructing a streams splitting operator to create a parallel region with identical stream operators and at least the same system resource allocations as the original execution path to handle processing of the increased tuple traffic. System resources may be divided among the parallel regions based on the performance of each individual parallel region (e.g., prioritizing achievement of soft limits for each parallel region before hard limits). Other methods of resolving the tuple flow model are also possible.

At block 1080, the stream of tuples may be processed. The processing may be performed using the tuple flow model with respect to the set of containers in the stream computing environment. Method 1000 concludes at block 1099. Aspects of method 1000 may provide performance or efficiency benefits related to tuple traffic management in a stream computing environment to process a stream of tuples. Altogether, leveraging control group data management with respect to a set of containers in a stream computing environment may be associated with benefits including load-balancing efficiency, flexibility, and stream computing performance. Aspects may save resources such as bandwidth, processing, or memory.

Figure 11:
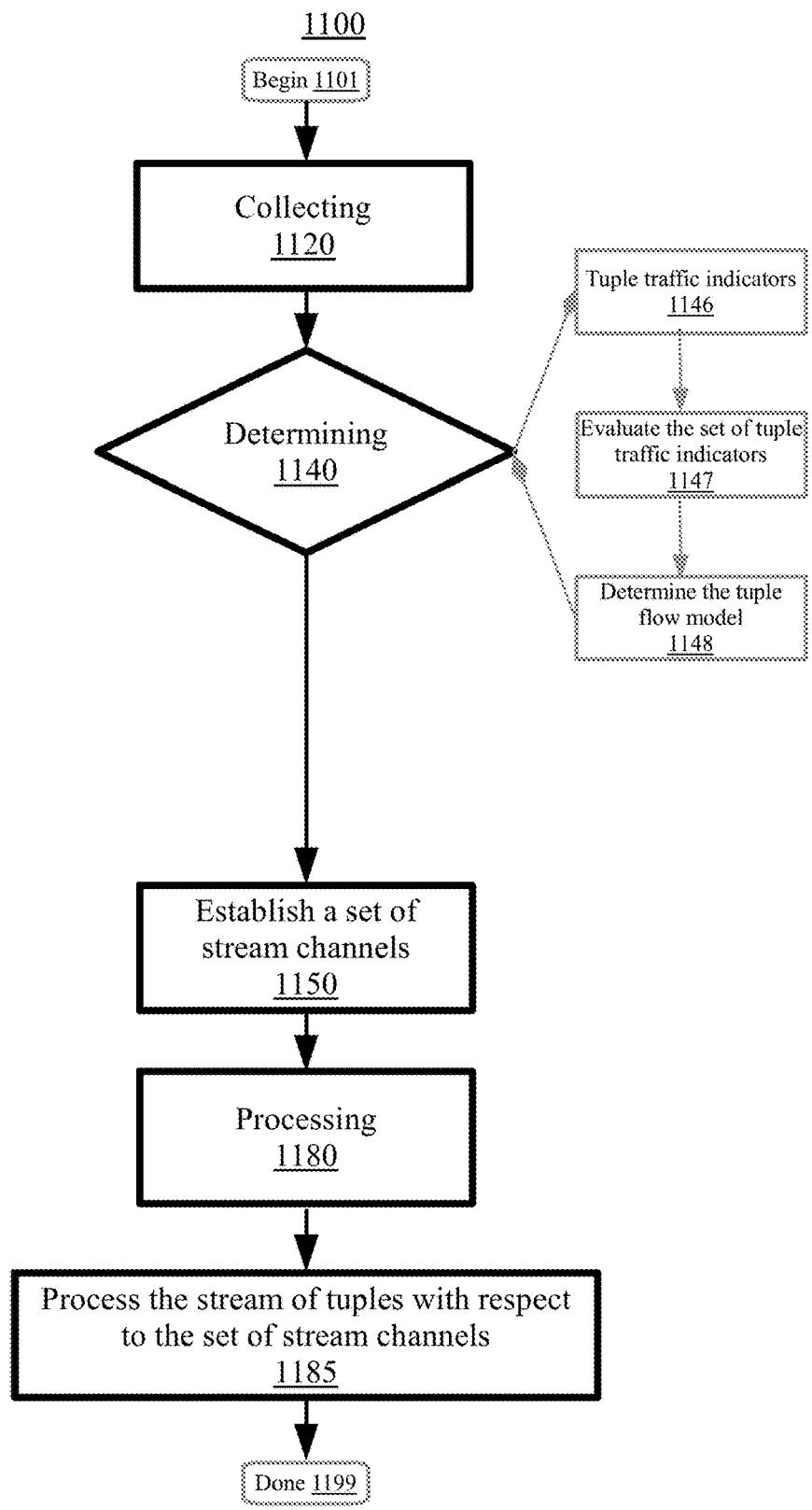
FIG. 11 is a flowchart illustrating a method for tuple traffic management in a stream computing environment, according to embodiments.

FIG. 11 is a flowchart illustrating a method 1100 for tuple traffic management in a stream computing environment to process a stream of tuples using a set of control group data with respect to a set of operation-system-level virtualization and resource isolation containers, according to embodiments. Aspects of FIG. 11 relate to determining a tuple flow model based on an evaluation of a set of tuple traffic indicators with respect to a set of tuple traffic benchmarks. Aspects of 1100 may be similar or the same as aspects of method 900/1000, and aspects may be utilized interchangeably. The method 1100 may begin at block 1101. At block 1120, the set of control group data may be collected. The collecting may be performed with respect to a set of containers in the stream computing environment. At block 1140, a tuple flow model may be determined. The determining may be performed with respect to the set of containers in the stream computing environment. The determining may be performed based on the set of control group data.

In embodiments, a set of tuple traffic indicators may be detected at block 1146. The detecting may be performed in the stream computing environment. Generally, detecting can include sensing, discovering, computing, calculating, distinguishing, ascertaining, or otherwise determining the set of tuple traffic indicators in the stream computing environment. The set of tuple traffic indicators may include a collection of measured values, historical information, or other data that characterizes tuple throughput in the stream computing environment. For instance, the set of tuple traffic indicators may indicate the amount (e.g., 10 gigabytes), rate (e.g., 1000 tuples per second), type (e.g., Internet-of-Things data), workload intensity (e.g., heavy, light), priority level (e.g., high, low), congestion (e.g., 20% backpressure) or other factors that describe the nature of tuple flow with respect to the set of container. In embodiments, detecting may include using a streams management engine to perform a series of traffic diagnostic operations with respect to the set of containers of the stream computing environment to capture the set of tuple traffic indicators. For instance, the streams management engine may monitor the number of tuples that pass through each stream operator/processing element per unit time, the average time for a tuple to flow through a given region of an operator graph, the number of tuples stored in queues/buffers, traffic flow over different time periods (e.g., morning, afternoon, evening, night), or other metrics that indicate tuple behavior. As an example, in certain embodiments, the streams management engine may monitor the set of containers and detect a set of tuple traffic indicators that specify an average tuple throughput rate of 800 tuples per second, an average tuple transit time of 1.3 seconds, 30% congestion between 8:00 AM and 12:00 PM, and 60% congestion between 2:00 PM and 4:00 PM each day. Other methods of detecting the set of tuple traffic indicators are also possible.

In embodiments, the set of tuple traffic indicators may be evaluated at block 1147. The evaluating may be performed with respect to a set of tuple traffic benchmarks. Generally, evaluating can include appraising, analyzing, investigating, inspecting, assessing, or otherwise examining the set of tuple traffic indicators with respect to a set of tuple traffic benchmarks. The set of tuple traffic benchmarks may include reference values, historical norms, or criteria that may be used to quantitatively appraise the tuple processing performance of the set of containers in the stream computing environment utilizing the set of tuple traffic indicators. For instance, the set of tuple traffic benchmarks may include historical tuple throughput information that indicates tuple throughput rates for the set of containers in past usage scenarios. As an example, the set of tuple traffic benchmarks may indicate a benchmark throughput rate of between 1000 and 1200 tuples per second, an average tuple transit time of 0.5-0.7 seconds, and a congestion rate of 6-8%. In embodiments, evaluating may include comparing the set of tuple traffic indicators with respect to the set of tuple traffic benchmarks to generate an assessment of the throughput performance level of the current configuration of the set of containers in the stream computing environment. In embodiments, evaluating may include computing and assigning a throughput performance score (e.g., integer value between 0 and 100, where higher values indicate better performance) to the set of containers based on the comparison between the set of tuple traffic indicators and the set of tuple traffic benchmarks. As an example, consider once again the set of example tuple traffic indicators described herein which indicate an average tuple throughput rate of 800 tuples per second, an average tuple transit time of 1.3 seconds, 30% congestion between 8:00 AM and 12:00 PM, and 60% congestion between 2:00 PM and 4:00 PM each day. The set of example tuple traffic indicators may be compared to the set of tuple traffic benchmarks indicating a tuple throughput rate between 1000 and 1200 tuples per second, an average tuple transit time of 0.5-0.7 seconds, and a congestion rate of 6-8%, and the difference between the set of tuple traffic indicators and the set of tuple traffic benchmarks may be used to generate a throughput performance score for the stream computing environment of "61." Other methods of evaluating the set of tuple traffic indicators with respect to the set of tuple traffic benchmarks are also possible.

In embodiments, the tuple flow model may be determined at block 1148. The determining may be performed based on the evaluation. The determining may be performed related to establishing the set of stream channels which use the set of containers in the stream computing environment. Generally, determining can include computing, formulating, generating, resolving, calculating, selecting, identifying, or otherwise ascertaining the tuple flow model based on the evaluation. As described herein, determining the tuple flow model may include formulating an arrangement of network assets (e.g., stream operators, processing elements, containers, physical hardware, resources) that is associated with positive impacts with respect to tuple processing by the set of containers of the stream computing environment. In embodiments, determining the tuple flow model based on the evaluation may include generating a network topology configuration for the stream computing environment that achieves a target tuple throughput rate (e.g., throughput performance score). For instance, determining the tuple flow model may include modifying the number of parallel regions to allow for greater traffic flow, dividing tuples between stream channels to balance tuple processing workloads, allocating or requisitioning additional stream computing resources for use by the set of containers, or the like. As an example, determining the tuple flow model may include establishing a set of stream channels and dividing a stream of tuples between the set of stream channels based on the performance characteristics of each stream channel to promote tuple throughput with respect to the set of containers. Other methods of determining the tuple flow model based on the evaluation are also possible.

At block 1150, a set of stream channels may be established. The set of stream channels may use the set of containers in the stream computing environment. The establishing may be performed based on the tuple flow model. Generally, establishing can include creating, generating, setting-up, arranging, instituting, instantiating, or otherwise structuring the set of stream channels to use the set of containers in the stream computing environment. The set of stream channels may include one or more branches, routes, links, or paths for conveying tuples through an operator graph. The set of stream channels may be used to carry tuples from one operator/processing element to another operator/processing element on the same container or a separate container. In embodiments, establishing the set of stream channels may include introducing new (e.g., additional) stream channels to the stream computing environment based on the tuple flow model. For instance, consider a stream computing environment that includes two stream channels running on a set of two containers. In embodiments, the tuple flow model may call for creation of two additional stream channels to promote tuple throughput. Accordingly, an additional two stream channels may be generated with respect to the stream computing environment, and established on the set of two containers. In embodiments, establishing the set of stream channels may include modifying existing stream channels in the stream computing environment. As an example, establishing may include using a streams management engine to allocate additional computing resources (e.g., from a shared pool of configurable computing resources) to the stream operators and processing elements of the existing stream channels to increase the number of tuples that can be processed per given time. Other methods of establishing the set of stream channels are also possible.

At block 1180, the stream of tuples may be processed. The processing may be performed using the tuple flow model with respect to the set of containers in the stream computing environment.

At block 1185, the stream of tuples may be processed using the tuple flow model with respect to the set of stream channels which use the set of containers in the stream computing environment. Generally, processing can include analyzing, evaluating, altering, investigating, examining, modifying, or otherwise managing the stream of tuples using the tuple flow model with respect to the set of stream channels in the stream computing environment. In embodiments, processing the stream of tuples may include routing the stream of tuples through the stream computing environment using the set of stream channels. In embodiments, processing may include evaluating the performance (e.g., throughput rate) of a plurality of stream channels of the set of stream channels, and dividing the stream of tuples among the set of stream channels based on the performance characteristics of each channel (e.g., such that stream channels with better performance receive larger portions of the stream of tuples for processing). As an example, consider a first stream channel having a throughput rate of 1200 tuples per second, and a second stream channel having a throughput rate of 1800 tuples per second. Accordingly, 60% of a stream of tuples may be routed to the second stream channel, and 40% of the stream of tuples may be routed to the first stream channel to facilitate load balancing with respect to the set of containers in the stream computing environment. Other methods of processing the stream of tuples using the tuple flow model with respect to the set of stream channels are also possible.

Method 1100 concludes at block 1199. Aspects of method 1100 may provide performance or efficiency benefits related to tuple traffic management in a stream computing environment. Altogether, leveraging control group data management with respect to a set of containers in a stream computing environment may be associated with benefits including load-balancing efficiency, flexibility, and stream computing performance. Aspects may save resources such as bandwidth, processing, or memory.

Figure 12:
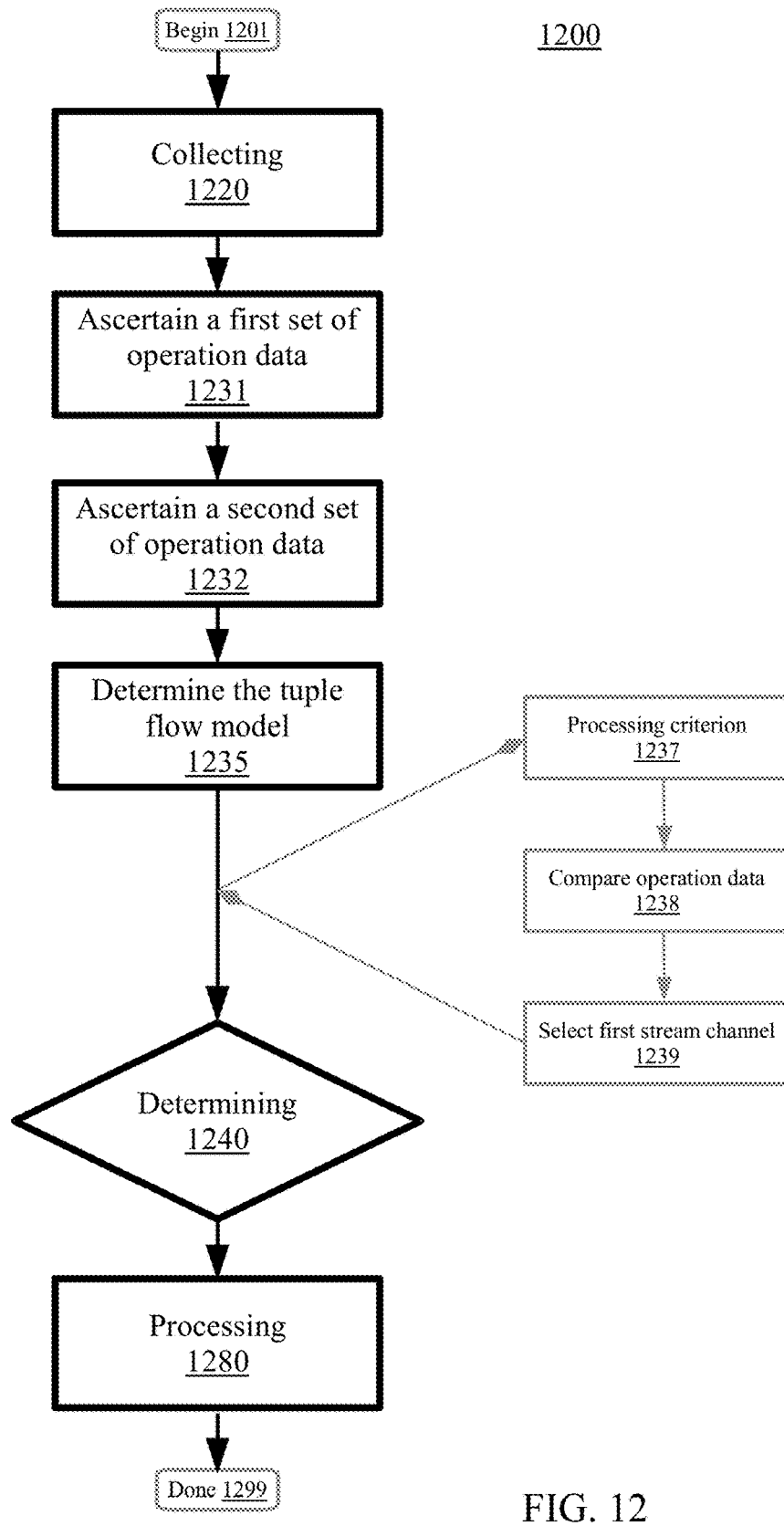
FIG. 12 is a flowchart illustrating a method for tuple traffic management in a stream computing environment, according to embodiments.

FIG. 12 is a flowchart illustrating a method 1200 for tuple traffic management in a stream computing environment to process a stream of tuples using a set of control group data with respect to a set of operation-system-level virtualization and resource isolation containers, according to embodiments. Aspects of 1200 may be similar or the same as aspects of method 900/1000/1100, and aspects may be utilized interchangeably. The method 1200 may begin at block 1201. At block 1220, the set of control group data may be collected. The collecting may be performed with respect to a set of containers in the stream computing environment.

At block 1231, a first set of operation data for a first stream channel of a set of stream channels may be ascertained. The first stream channel may use a first container of the set of containers in the stream computing environment. The ascertaining may be performed based on the set of control group data. Generally, ascertaining can include computing, formulating, generating, calculating, selecting, identifying, or otherwise determining the first set of operation data for the first stream channel of the set of stream channels. The first set of operation data may include a collection of information that characterizes the operational performance of the first stream channel of the set of stream channels. For instance, the first set of operation data may indicate the throughput rate (e.g., 1500 tuples per second), congestion level (e.g., 11%), resource usage efficiency (e.g., 86%), time until tuple processing completion (e.g., 4 seconds), or the like. In embodiments, ascertaining the first set of operation data may include using a streams management engine to perform a series of performance diagnostic operations with respect to the set of stream channels of the stream computing environment to capture the first set of operation data for the first stream channel. As an example, a first set of operation data for the first stream channel may be ascertained that indicates that the first stream channel has an average throughput rate of 1380 tuples per second, a congestion level of 14%, a resource usage efficiency of 79%, and a tuple processing completion time (e.g., from source to sink) of 9 seconds. Other methods of ascertaining the first set of operation data for the first stream channel of the set of stream channels are also possible.

At block 1232, a second set of operation data for a second stream channel of the set of stream channels may be ascertained. The second stream channel may use a second container of the set of containers in the stream computing environment. The ascertaining may be performed based on the set of control group data. Generally, ascertaining can include computing, formulating, generating, calculating, selecting, identifying, or otherwise determining the second set of operation data for the second stream channel of the set of stream channels. The second set of operation data may include a collection of information that characterizes the operational performance of the second stream channel of the set of stream channels. For instance, the second set of operation data may indicate the throughput rate (e.g., 3400 tuples per second), congestion level (e.g., 3.1%), resource usage efficiency (e.g., 65%), time until tuple processing completion (e.g., 0.4 seconds), or the like. In embodiments, ascertaining the second set of operation data may include using a streams management engine to perform a series of performance diagnostic operations with respect to the set of stream channels of the stream computing environment to capture the second set of operation data for the second stream channel. As an example, a second set of operation data for the second stream channel may be ascertained that indicates that the second stream channel has an average throughput rate of 1840 tuples per second, a congestion level of 8%, a resource usage efficiency of 82%, and a tuple processing completion time (e.g., from source to sink) of 14 seconds. Other methods of ascertaining the second set of operation data for the second stream channel of the set of stream channels are also possible.

At block 1235, the tuple flow model may be determined. The determining may be performed with respect to the set of containers in the stream computing environment. The determining may be performed using the first and second sets of operation data. Generally, determining can include computing, formulating, generating, resolving, calculating, selecting, identifying, or otherwise ascertaining the tuple flow model using the first and second sets of operation data. In embodiments, determining the tuple flow model may include ascertaining a network topology configuration for the set of containers in the stream computing environment based on the first and second sets of operation data for the first and second stream channels, respectively. As examples, determining may include requisitioning additional system resources (e.g., memory, processor, bandwidth) for allocation to those stream channels associated with sets of operation data that fail to achieve a minimum performance threshold, balancing tuple traffic among the set of stream channels based on the tuple throughput values indicated by the first and second sets of operation data, adding additional stream channels to alleviate tuple congestion, removing existing channels associated with tuple flow below an activity threshold (e.g., idle channels), or the like. Other methods of determining the tuple flow model using the first and second sets of operation data are also possible.

In embodiments, it may be identified that both the first and second stream channels achieve a processing criterion for the stream of tuples at block 1237. Generally, identifying can include sensing, discovering, computing, recognizing, distinguishing, ascertaining, or otherwise determining that both the first and second channels achieve the processing criterion. The processing criterion may include a benchmark, reference value, or threshold that defines a boundary with respect to the processing performance of the first and second stream channels. For instance, in certain embodiments, stream channels that achieve the processing criterion may be ascertained to be suitable/appropriate for receiving at least a portion of the stream of tuples, while stream channels that fail to achieve the processing criterion may be ascertained to be unsuitable/unfit for receiving a portion of the stream of tuples. As examples, the processing criterion may include a threshold tuple throughput value, a threshold congestion level, a threshold resource usage efficiency, a tuple processing completion time threshold, or the like. In embodiments, identifying may include examining the first and second sets of operation data with respect to the processing criterion, and ascertaining that both the first and second stream channels satisfy (e.g., exceed, fulfill) the processing criterion. As an example, consider a processing criterion of "congestion level of no more than 15%." With reference to the previous examples described herein, the congestion level of the first set of operation data of 14% and the congestion level of the second set of operation data of 8% may be examined with respect to the congestion level indicated by the processing criterion of "15%." Accordingly, it may be identified that both the first and second stream channels achieve the processing criterion (e.g., the congestion levels for both the first and second stream channels are less than the specified threshold value of 15%). Other methods of identifying that both the first and second stream channels achieve the processing criterion are also possible.

In embodiments, the first and second sets of operation data may be compared at block 1238. Generally, comparing can include contrasting, investigating, analyzing, juxtaposing, correlating, or otherwise evaluating the first and second sets of operation data in parallel. In embodiments, comparing may include examining the first set of operation data for the first stream channel with respect to the second set of operation data for the second stream channel. For instance, in certain embodiments, comparing may include determining a relationship between the magnitude of the first set of operation data with respect to the magnitude of the second set of operation data. As an example, a congestion level of the first set of operation data of 14% may be compared with respect to the congestion level of the second set of operation data of 8%, and it may be ascertained that the magnitude of the first set of operation data exceeds the magnitude of the second set of operation data. In certain embodiments, comparing may include assigning a weighting value to one or more elements of the operation data based on the current configuration of the stream computing environment (e.g., current performance level, resource needs of the set of containers), and subsequently performing a weighted comparison of the overall performance efficiency of the first stream channel with respect to the second stream channel (e.g., in some stream computing environments tuple transit time may be weighted higher than throughput rate, resource usage efficiency may be weighted higher than congestion level, or the like). Other methods of comparing the first and second sets of operation data are also possible.

In embodiments, the first stream channel may be selected to process the stream of tuples at block 1239. The selecting may be performed based on the first stream channel outperforming the second stream channel as indicated by the first and second sets of operation data. Generally, selecting can include choosing, ascertaining, picking-out, electing, determining, or otherwise identifying the first channel to process the stream of tuples based on the first stream channel outperforming the second stream channel as indicated by the first and second sets of operation data. In embodiments, selecting may include prioritizing the first stream channel for tuple processing with respect to the second stream channel, establishing the first stream channel as part of the tuple flow model, maintaining the first stream channel while removing the second stream channel, or otherwise designating the first stream channel for utilization for routing and processing of the stream of tuples. In embodiments, the first stream channel may be selected based on the results of the comparison between the first stream channel and the second stream channel indicating that the first stream channel outperforms the second stream channel. For instance, the first stream channel may be selected in response to ascertaining that the first stream channel has a greater tuple throughput rate, a lower congestion level, higher resource usage efficiency, faster tuple transit times, or the like (e.g., based on the performance objectives and goals of the stream computing environment). Consider the following example. A stream computing environment having a first stream channel and a second stream channel may be utilized for hosting lightweight system performance monitoring applications that prioritize resource efficiency over total tuple throughput (e.g., resource efficiency is weighted more heavily than tuple throughput rate and other metrics). The first stream channel may be associated with a first set of operation data indicating a tuple throughput rate of 1700 tuples per second, a congestion level of 15%, and a resource usage efficiency of 98%, and the second stream channel may be associated with a second set of operation data indicating a tuple throughput rate of 1900 tuples per second, a congestion level of 18%, and a resource efficiency of 83%. Accordingly, in response to comparing the first and second sets of operation data for the first and second stream channels, it may be determined that the first stream channel outperforms the second stream channel with respect to resource usage efficiency (e.g., the resource usage efficiency value of 98% exceeds the resource usage efficiency value of 83%), and the first stream channel may be selected for utilization to process the stream of tuples. Other methods of selecting the first stream channel to process the stream of tuples based on the first stream channel outperforming the second stream channel as indicated by the first and second sets of operation data are also possible.

At block 1240, a tuple flow model may be determined. The determining may be performed with respect to the set of containers in the stream computing environment. The determining may be performed based on the set of control group data. At block 1280, the stream of tuples may be processed. The processing may be performed using the tuple flow model with respect to the set of containers in the stream computing environment. Method 1200 concludes at block 1299. Aspects of method 1200 may provide performance or efficiency benefits related to tuple traffic management in a stream computing environment. Altogether, leveraging control group data management with respect to a set of containers in a stream computing environment may be associated with benefits including load-balancing efficiency, flexibility, and stream computing performance. Aspects may save resources such as bandwidth, processing, or memory.

Figure 13:
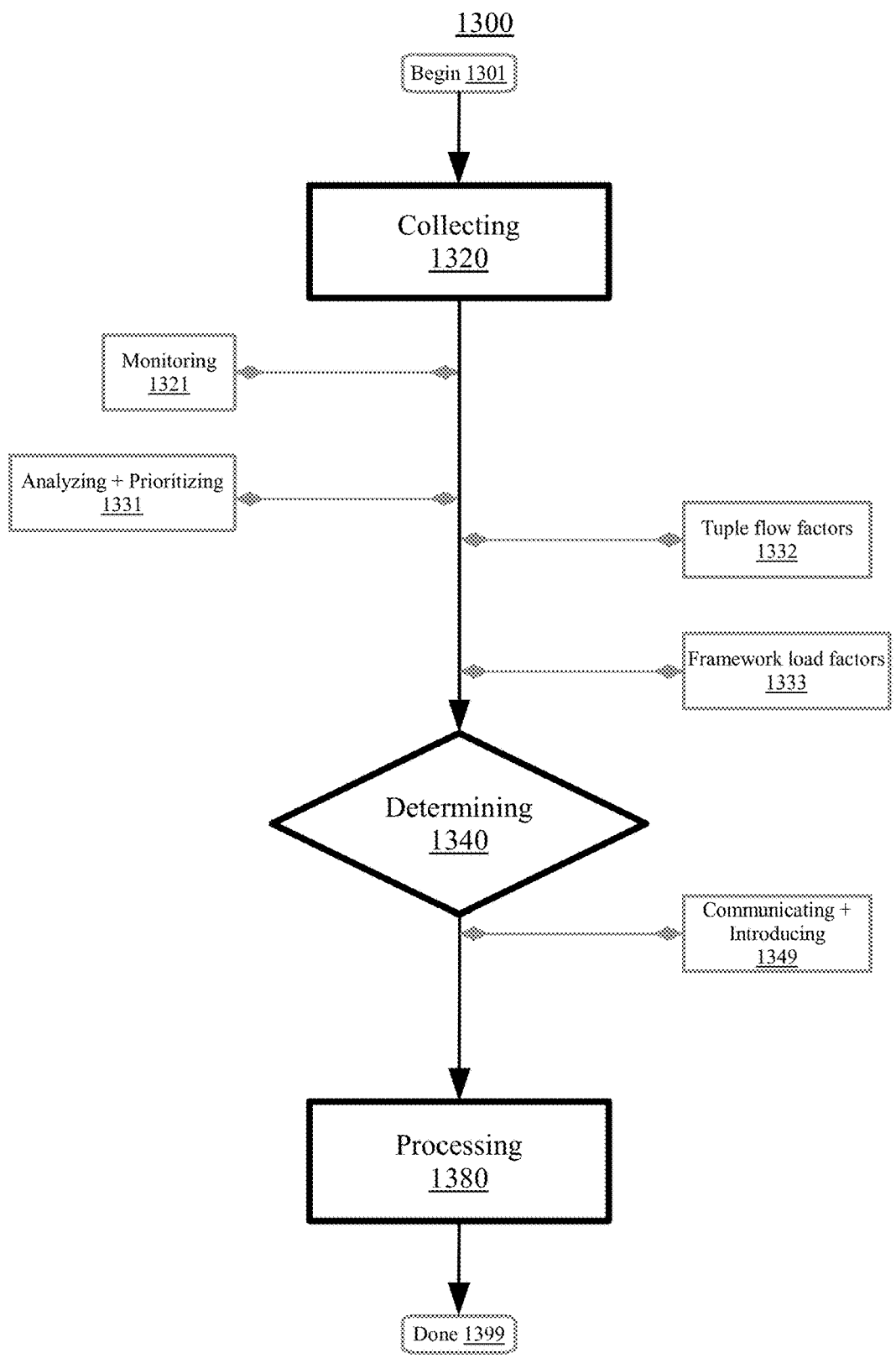
FIG. 13 is a flowchart illustrating a method for tuple traffic management in a stream computing environment, according to embodiments.

FIG. 13 is a flowchart illustrating a method 1300 for tuple traffic management in a stream computing environment to process a stream of tuples using a set of control group data with respect to a set of operation-system-level virtualization and resource isolation containers, according to embodiments. Aspects of the method 1300 relate to determining a tuple flow model based on one or more of monitoring network congestion, processor usage, and memory usage, tuple flow factors, or framework load factors. Aspects of 1300 may be similar or the same as aspects of method 900/1000/1100/1200, and aspects may be utilized interchangeably. The method 1300 may begin at block 1301. At block 1320, the set of control group data may be collected. The collecting may be performed with respect to a set of containers in the stream computing environment.

In embodiments, the set of control group data may be collected at block 1321. The collecting may be performed by monitoring network congestion associated with a device of a host. The collecting may be performed by monitoring processor usage related to one or more container processor allotments. The collecting may be performed by monitoring memory usage related to one or more container memory allotments. In embodiments, the network congestion may include an indication of the degree or extent of tuple build-up (e.g., tuples in buffers/queues waiting to be processed), crowding, blockage, or bottlenecks in the stream computing environment. As an example, the network congestion may be expressed as a percentage (e.g., 15%, 30%, 60%) of how many tuples are in the operator graph are waiting to be processed at a given point in time. Monitoring network congestion may include using a block input/output control group to observe the amount of network traffic being received, sent, and processed by the network adapter or disk of a host node. In embodiments, the processor usage may include an indication of the degree or extent to which processing resources (e.g., CPUs) of a particular container or group of containers are being utilized. Monitoring the processor usage may include overseeing the utilization levels of CPUs allocated for use by one or more containers, and ascertaining if the processor usage falls within a range of acceptable usage levels (e.g., defined by soft and hard usage limits for the CPU). For instance, the processor usage may indicate a percentage of processor utilization (e.g., 81%), the number of CPUs in use by stream computing applications (e.g., 2.5 CPUs), or an expression of the absolute amount of processor resources utilized by a container (e.g., 3.2 gigahertz). In embodiments, the memory usage may include an indication of the degree or extent to which memory resources (e.g., random-access memory) of a particular container are being utilized (e.g., by stream operators or processing elements to process tuples). As an example, the memory usage may indicate a percentage of memory utilization (e.g., 45%), or an expression of the amount of memory resources in use (e.g., 500 megabytes, 3 gigabytes). Monitoring the memory usage may include performing one or more diagnostics with respect to a container or group of containers to determine a relationship between the amount of memory used by the containers and a container memory allotment for that container (e.g., memory usage exceeds a soft limit, memory usage is approaching a hard limit). Other methods of collecting the set of control group data are also possible.

In embodiments, the set of control group data may be analyzed at block 1331. The analyzing may be performed with respect to a set of processing elements in the stream computing environment. Generally, analyzing can include appraising, investigating, inspecting, probing, assessing, parsing, or otherwise examining the set of control group data. In embodiments, analyzing the set of control group data may include parsing metadata for a set of tuples to detect sets of tuples associated with one or more identification tags. As an example, analyzing may include detecting tuples associated with an identification tag of a class identifier (e.g., net_cls) that indicates the particular control group from which the tuple originated. As another example, analyzing may include detecting tuples associated with a network priority tag (e.g., net_prio) that indicates the relative priority of the tuples with respect to other tuples in the stream computing environment. In embodiments, certain tuple traffic which corresponds to a certain subset of the set of processing elements may be prioritized. The prioritizing may be performed related to determining the tuple flow model and processing the stream of tuples. The prioritizing may be performed to streamline tuple traffic management in the stream computing environment. Generally, prioritizing can include arranging, weighting, organizing, promoting, ranking, or otherwise favoring certain tuple traffic which corresponds to a certain subset of the set of processing elements. In embodiments, prioritizing may include using a traffic controller for the stream computing environment to determine particular groups of tuples to be sent to certain containers, queued for later processing, or dropped from the stream computing environment based on the class identifier or the network priority tag. As examples, prioritizing may include expediting processing of tuple traffic that originates from stream operators/processing elements with tuple throughput rates below a threshold (e.g., to catch them up to current traffic flow), or designating stream operators/processing elements associated with tuple throughput rates above a threshold for tuple processing (e.g., to process tuples faster to prevent congestion or slow-down) as indicated by the class identifier or network priority tag associated with the set of tuples. Other methods of analyzing the set of control group data and prioritizing certain tuple traffic which corresponds to a certain subset of the set of processing elements are also possible.

In embodiments, a set of tuple flow factors may be identified at block 1332. The identifying may be performed based on the set of control group data. Generally, identifying can include sensing, discovering, computing, recognizing, distinguishing, ascertaining, or otherwise determining the set of tuple flow factors based on the set of control group data. The set of tuple flow factors may include attributes, properties, causes, or elements of the stream computing environment that impact the throughput rate of tuples. As an example, the set of tuple flow factors may include a resource limitation (e.g., with respect to network, disk, CPU, memory, unallocated shared resources) that restricts the number of tuples that can be processed by the set of containers. In embodiments, identifying the set of tuple flow factors may include detecting one or more stream operators/processing elements that are associated with tuple throughput rates below a threshold value, and examining them to ascertain which resource is limiting the tuple processing capability of the stream operator/processing element. As an example, identifying may include analyzing an operator graph of a stream computing environment, and detecting that a lack of memory resources with respect to a first processing element is inhibiting the flow of tuples. Accordingly, a set of tuple flow factors of "memory" may be identified for the stream computing environment. In embodiments, the tuple flow model may be determined with respect to the set of containers in the stream computing environment. The determining may be performed based on the set of tuple flow factors. Generally, determining can include computing, formulating, resolving, calculating, selecting, identifying, or otherwise ascertaining the tuple flow model based on the set of tuple flow factors. In embodiments, determining may include generating a network topology configuration for the set of containers in the stream computing environment based on the set of tuple flow factors. As an example, determining may include redistributing existing system resources among the stream operators/processing elements of the stream computing environment to positively impact (e.g., mitigate, alleviate) congestion/bottlenecks. In certain embodiments, determining may include requisitioning additional system resources for allocation to those stream operators/processing elements associated with the set of tuple flow factors. As an example, in response to determining that a first processing element is associated with a set of tuple flow factors of "memory," determining the tuple flow model may include requesting additional memory resources from the shared pool of configurable computing resources for distribution to the first processing element. Other methods of identifying the set of tuple flow factors and determining the tuple flow model based on the set of tuple flow factors are also possible.

In embodiments, a set of framework load factors may be identified at block 1333. The identifying may be performed based on the set of control group data. Generally, identifying can include discovering, computing, recognizing, distinguishing, ascertaining, or otherwise determining the set of framework load factors based on the set of control group data. The set of framework load factors may include attributes, measurements, properties, or other aspects of the stream computing environment that indicate the distribution of system resources, application workload, or tuple traffic load between the set of containers. For instance, the set of framework load factors may indicate that a first container is utilizing 96% of its allocated system resources to manage a current tuple load (e.g., such that assigning additional tuples/work to the first container may result in system slowdown or congestion), and that a second container is utilizing 23% of its allocated system resources to manage a current tuple load (e.g., such that it has available resources to handle additional tuple processing or workload tasks). In embodiments, the set of framework load factors may indicate the distribution of the stream of tuples among the set of containers. For instance, in embodiments, identifying the set of framework load factors may include using a streams management engine to scan the stream computing environment, and ascertain the tuple processing workloads of the set of containers. As an example, the set of framework load factors may indicate that a first container is assigned 43% of the stream of tuples for processing, a second container is assigned 26% of the stream of tuples, a third container is assigned 19% of the stream of tuples, and a fourth container is assigned 12% of the stream of tuples. In embodiments, the tuple flow model may be determined with respect to the set of containers in the stream computing environment. The determining may be performed based on the set of framework load factors. Generally, determining can include computing, formulating, generating, resolving, calculating, selecting, identifying, or otherwise ascertaining the tuple flow model based on the set of framework load factors. In embodiments, determining can include generating a network topology configuration for the set of containers in the stream computing environment based on the set of framework load factors. For instance, determining may include balancing distribution of stream computing application elements (e.g., stream operators/processing elements) among the containers in the stream computing environment based on their existing workloads and level of available resources. As an example, the stream of tuples may be split among a set of parallel regions of the set of containers such that each container receives an amount of tuples proportional to the amount of system resources it has available. Other methods of determining the tuple flow model based on the set of framework load factors are also possible.

At block 1340, a tuple flow model may be determined. The determining may be performed with respect to the set of containers in the stream computing environment. The determining may be performed based on the set of control group data.

In embodiments, both a set of tuple flow factors and a set of framework load factors may be communicated at block 1349. The communicating may be performed to an upstream stream operator. Generally, communicating can include conveying, transferring, relaying, informing, passing-on, or otherwise transmitting both the set of tuple flow factors and the set of framework load factors to the upstream stream operator. The upstream stream operator may include a stream operator or processing element that is located prior to (e.g., closer distance to a source operator) the set of stream operators/processing elements associated with the set of tuple flow factors and the set of framework load factors in the operator graph. In embodiments, communicating may include relaying the set of tuple flow factors and the set of framework load factors to an upstream stream splitter operator (e.g., such that the stream splitter operator may implement a tuple flow model based on the received information). In embodiments, the tuple flow model may be introduced with respect to the set of containers in the stream computing environment. The introducing may be performed by the upstream stream operator using both the set of tuple flow factors and the set of framework load factors. Generally, introducing can include instantiating, initiating, creating, establishing, installing, adding, inserting, or otherwise implementing the tuple flow model using both the set of tuple flow factors and the set of framework load factors. In embodiments, introducing can include formulating a network topology configuration for the set of containers based on both the set of tuple flow factors and the set of framework load factors, and subsequently instantiating the network topology configuration in the stream computing environment. As an example, the stream splitting operator may make use of the set of tuple flow factors and the set of framework load factors to generate a tuple flow model that balances tuple distribution between the set of containers so as to mitigate the impact of the set of tuple flow factors on tuple throughput rate (e.g., such that a single resource limitation does not significantly impact the potential performance of a container). Other methods of communicating the set of tuple flow factors and the set of framework load factors to an upstream stream operator and introducing the tuple flow model based on both the set of tuple flow factors and the set of framework load factors are also possible.

At block 1380, the stream of tuples may be processed. The processing may be performed using the tuple flow model with respect to the set of containers in the stream computing environment. Method 1300 concludes at block 1399. Aspects of method 1300 may provide performance or efficiency benefits related to tuple traffic management in a stream computing environment. Altogether, leveraging control group data management with respect to a set of containers in a stream computing environment may be associated with benefits including load-balancing efficiency, flexibility, and stream computing performance. Aspects may save resources such as bandwidth, processing, or memory.

Figure 14:
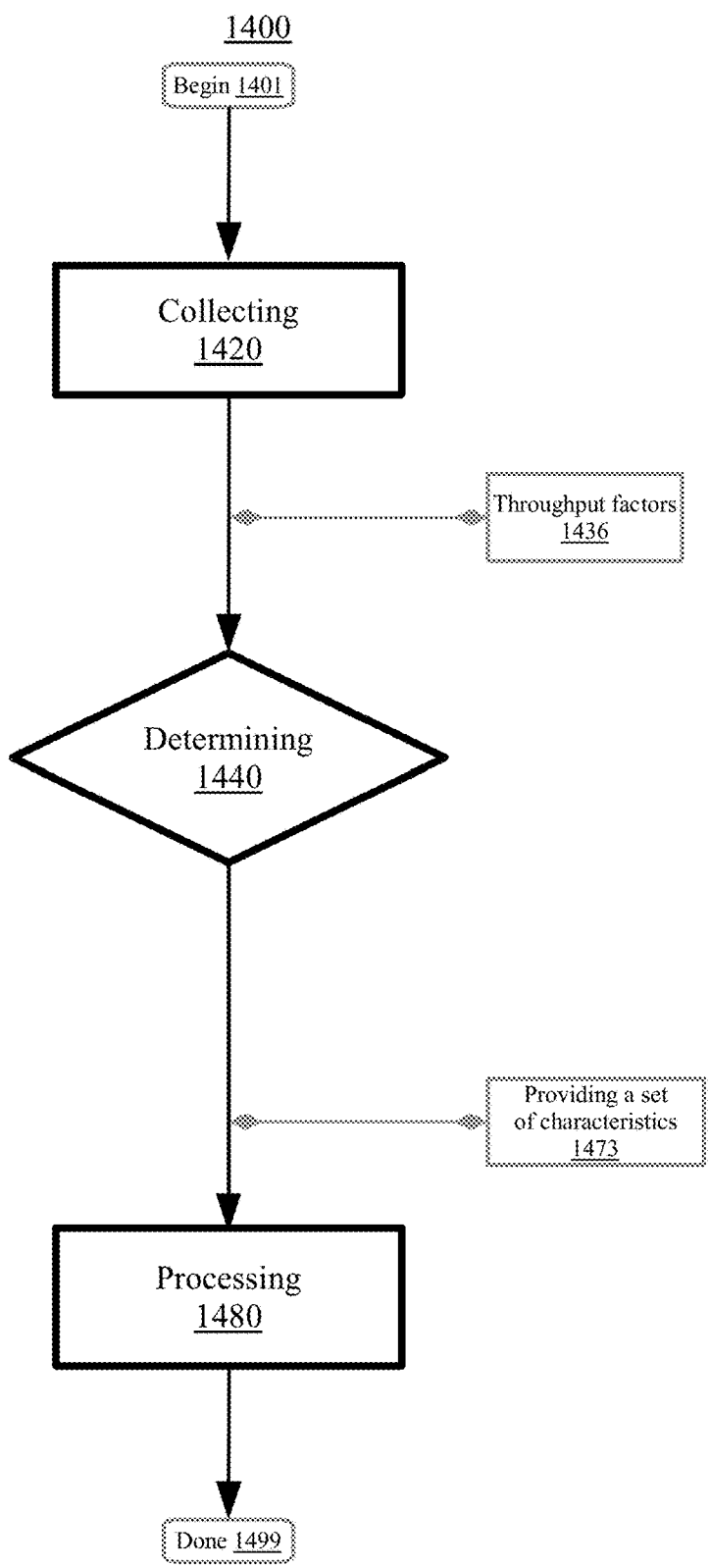
FIG. 14 is a flowchart illustrating a method for tuple traffic management in a stream computing environment, according to embodiments.

FIG. 14 is a flowchart illustrating a method 1400 for tuple traffic management in a stream computing environment to process a stream of tuples using a set of control group data with respect to a set of operation-system-level virtualization and resource isolation containers, according to embodiments. Aspects of the method 1400 relate to determining a tuple flow model based on a set of identified throughput factors for a set of stream channels which use the set of containers in the stream computing environment. Aspects of 1400 may be similar or the same as aspects of method 900/1000/1100/1200/1300, and aspects may be utilized interchangeably. The method 1400 may begin at block 1401. At block 1420, the set of control group data may be collected. The collecting may be performed with respect to a set of containers in the stream computing environment.

In embodiments, a set of throughput factors may be identified for a set of stream channels at block 1436. The set of stream channels may use the set of containers in the stream computing environment. Generally, identifying can include sensing, discovering, computing, recognizing, distinguishing, ascertaining, or otherwise determining the set of throughput factors for the set of stream channels which use the set of containers. As described herein, the set of stream channels may include one or more branches, routes, links, or paths for conveying tuples through an operator graph from one operator/processing element to another operator/processing element on the same container or a separate container in the stream computing environment. The set of throughput factors may include a collection of information that characterizes the tuple throughput performance of the set of stream channels. For instance, the set of throughput factors may indicate historical throughput rate information for the set of stream channels (e.g., historical average throughput rate of 2600 tuples per second), the current measured throughput rate of the set of stream channels (e.g., 2750 tuples per second), or an expected (e.g., projected/anticipated/forecasted/predicted) tuple throughput rate of the set of stream channels (e.g., 2300 tuples per second). In embodiments, identifying the set of throughput factors may include using a streams management engine to monitor the tuple processing operations/tuple throughput rate for the set of stream channels over a time period (e.g., 4 hours, 1 day, 2 weeks). In embodiments, the tuple flow model may be determined based on the set of throughput factors. The determining may be performed in a dynamic fashion. Generally, determining can include computing, formulating, generating, resolving, calculating, selecting, identifying, or otherwise ascertaining the tuple flow model based on the set of throughput factors. In embodiments, determining the tuple flow model may include assigning a weighting value to one or more stream channels of the set of stream channels based on the set of throughput factors, and using the weighting values to formulate the tuple flow model. For instance, in embodiments, stream channels with higher historical throughput rates may be assigned greater weighting values (e.g., indicating higher suitability/fitness for use as part of the tuple flow model). In embodiments, determining may include dynamically reconfiguring the tuple flow model (e.g., reassigning resources, rerouting streams of tuples, modifying stream channels) in real-time based on expected incoming tuple traffic loads. As an example, in response to identifying a set of throughput factors indicating a peak traffic time in which tuple traffic is expected to tuple for a 2 hour period for a first container, determining may include temporarily diverting system resources from an idle container for use by the first container. Other methods of identifying the set of throughput factors for the set of stream channels and determining the tuple flow model in a dynamic fashion based on the set of throughput factors are also possible.

At block 1440, a tuple flow model may be determined. The determining may be performed with respect to the set of containers in the stream computing environment. The determining may be performed based on the set of control group data.

In embodiments, a set of characteristics of the tuple flow model may be provided at block 1473. The set of characteristics may relate to the set of control group data. The providing may be performed using an integrated development environment. Generally, providing can include communicating, conveying, supplying, relaying, displaying, or otherwise presenting the set of characteristics of the tuple flow model. The set of characteristics of the tuple flow model may include a collection of data that indicates the current performance of the set of containers in the stream computing environment, expected performance of the set of containers at a future point in time, anticipated tuple traffic management techniques, or other information that characterizes the tuple flow model. In embodiments, the set of characteristics may include a visual simulation of how future tuple traffic will be allocated to a set of parallel regions (e.g., stream channels). The simulation may include one or more event tags to show requests for additional resources. For instance, the event tags may indicate the expected time at which additional resources will be needed, which operators they will needed by, the expected amount of requested resources, how the resources will be distributed among the containers, when soft limits of a particular container will be achieved, or the like. In embodiments, providing may include presenting the set of characteristics in an integrated development environment (IDE). The integrated development environment may include a software application interface to facilitate code editing, application building, and debugging operations with respect to stream computing applications. As an example, providing the set of characteristics may include displaying a representation of the network topology (e.g., operator graph) of the stream computing environment that is annotated by the set of characteristics (e.g., performance information shown for different stream channels, overlays illustrating simulated future traffic allocation scenarios). Other methods of providing the set of characteristics using the integrated development environment are also possible.

At block 1480, the stream of tuples may be processed. The processing may be performed using the tuple flow model with respect to the set of containers in the stream computing environment. Method 1400 concludes at block 1499. Aspects of method 1400 may provide performance or efficiency benefits related to tuple traffic management in a stream computing environment. Altogether, leveraging control group data management with respect to a set of containers in a stream computing environment may be associated with benefits including load-balancing efficiency, flexibility, and stream computing performance. Aspects may save resources such as bandwidth, processing, or memory.

Figure 15:
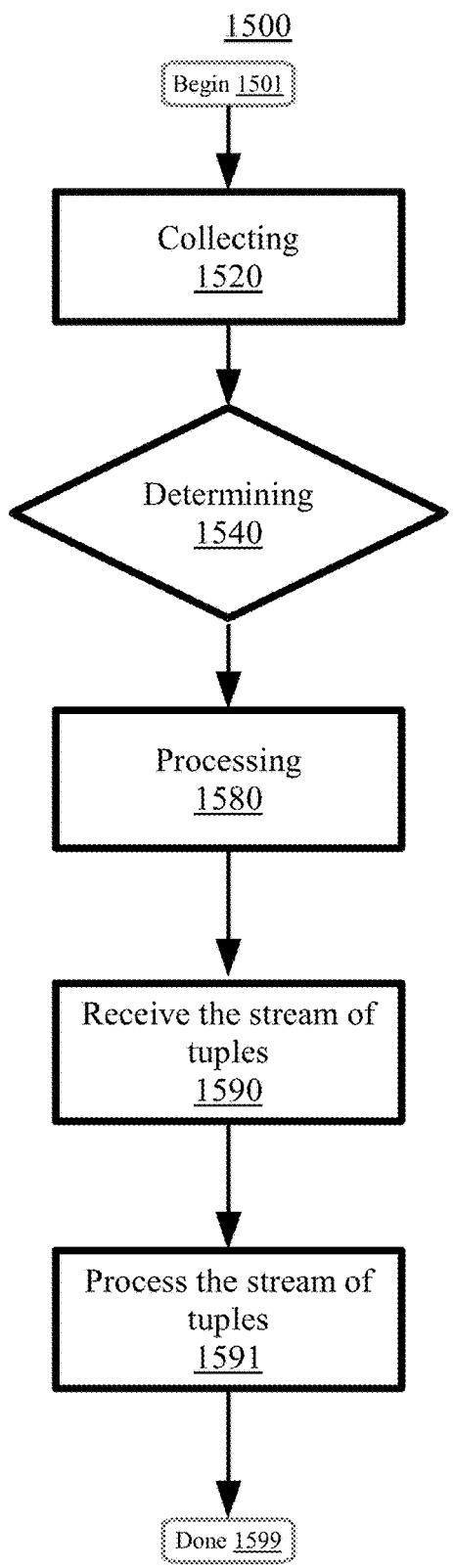
FIG. 15 is a flowchart illustrating a method for tuple traffic management in a stream computing environment, according to embodiments.

FIG. 15 is a flowchart illustrating a method 1500 for tuple traffic management in a stream computing environment to process a stream of tuples using a set of control group data with respect to a set of operation-system-level virtualization and resource isolation containers, according to embodiments. Aspects of 1500 may be similar or the same as aspects of method 900/1000/1100/1200/1300/1400, and aspects may be utilized interchangeably. The method 1500 may begin at block 1501. At block 1520, the set of control group data may be collected. The collecting may be performed with respect to a set of containers in the stream computing environment. At block 1540, a tuple flow model may be determined. The determining may be performed with respect to the set of containers in the stream computing environment. The determining may be performed based on the set of control group data. At block 1580, the stream of tuples may be processed. The processing may be performed using the tuple flow model with respect to the set of containers in the stream computing environment.

At block 1590, the stream of tuples may be received to be processed by a set of processing elements which operates on a set of compute nodes in the stream computing environment. The stream of tuples may be received consistent with the description herein including FIGS. 1-15. Current/future processing by the plurality of processing elements may be performed consistent with the description herein including FIGS. 1-15. The set of compute nodes may include a shared pool of configurable computing resources. For example, the set of compute nodes can include a public cloud environment, a private cloud environment, a distributed batch data processing environment, or a hybrid cloud environment. In certain embodiments, each of the set of compute nodes are physically separate from one another.

At block 1591, the stream of tuples may be processed using the set of processing elements operating on the set of compute nodes in the stream computing environment. The stream of tuples may be processed consistent with the description herein including FIGS. 1-15. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

Method 1500 concludes at block 1599. Aspects of method 1500 may provide performance or efficiency benefits related to tuple traffic management in a stream computing environment. Altogether, leveraging control group data management with respect to a set of containers in a stream computing environment may be associated with benefits including load-balancing efficiency, flexibility, and stream computing performance. Aspects may save resources such as bandwidth, processing, or memory.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for tuple traffic management in a stream computing environment to process a stream of tuples using a set of control group data with respect to a set of operation-system-level virtualization and resource isolation containers, the method comprising:
    collecting, with respect to a set of containers in the stream computing environment, the set of control group data by:
        monitoring network congestion associated with a device of a host, the monitoring network congestion including using a block input/output control group to observe the amount of network traffic being received, sent, and processed by a network adapter of a host node;
        monitoring processor usage related to one or more container processor allotments, the monitoring processor usage including overseeing the utilization levels of CPUs allocated for use by one or more containers and ascertaining whether the processor usage falls within a range of acceptable usage levels, and
        monitoring memory usage related to one or more container memory allotments, the monitoring memory usage including performing one or more diagnostics with respect to a first container to determine a relationship between the amount of memory used by the first container and a container memory allotment for the first container;
    analyzing the set of control group data with respect to a set of processing elements in the stream computing environment, the analyzing including detecting tuples associated with an identification tag of a class identifier that indicates a particular control group from which the tuple originated;
    prioritizing certain tuple traffic which corresponds to a certain subset of the set of processing elements to streamline tuple traffic management in the stream computing environment, the prioritizing including expediting processing of tuple traffic that originates from stream operators with tuple throughput rates below a threshold as indicated by the class identifier tag associated with the set of tuples;
    identifying, based on the set of control group data, a set of tuple flow factors, the identifying the set of tuple flow factors including analyzing an operator graph of the stream computing environment and detecting that a lack of memory resources with respect to a first processing element is inhibiting the flow of tuples;
    identifying, based on the set of control group data, a set of framework load factors, including using a streams management engine to scan the stream computing environment and ascertain the tuple processing workloads of the set of containers;
    determining, based on the set of control group data, a tuple flow model with respect to the set of containers in the stream computing environment, the determining the tuple flow model including requesting additional memory resources from a shared pool of configurable computing resources for distribution to the first processing element, the determining the tuple flow model further including generating a network topology configuration for the set of containers in the stream computing environment based on the set of framework load factors;
    communicating, to an upstream stream operator, both a set of tuple flow factors and a set of framework load factors;
    introducing, by the upstream stream operator using both the set of tuple flow factors and the set of framework load factors, the tuple flow model with respect to the set of containers in the stream computing environment; and
    processing, using the tuple flow model with respect to the set of containers in the stream computing environment, the stream of tuples.

* * * * *